United States Patent [19]

Kondoh

[11] Patent Number: 5,535,202
[45] Date of Patent: Jul. 9, 1996

[54] PRIORITY PROCESSING OF ATM CELLS USING SHIFT REGISTER STAGES

[75] Inventor: Harufusa Kondoh, Itami, Japan

[73] Assignee: Mitsubishi Denki Kabushiki Kaisha, Tokyo, Japan

[21] Appl. No.: 401,138

[22] Filed: Mar. 8, 1995

[30] Foreign Application Priority Data

Mar. 16, 1994 [JP] Japan ................................. 6-045762

[51] Int. Cl.$^6$ .................................................. H04L 12/56
[52] U.S. Cl. .......................................... 370/60.1; 370/85.6
[58] Field of Search .......................... 370/60, 60.1, 94.1, 370/94.2, 94.3, 85.6; 340/825.5, 825.51

[56] References Cited

U.S. PATENT DOCUMENTS

| | | | |
|---|---|---|---|
| 5,166,926 | 11/1992 | Cisneros et al. | 370/60 |
| 5,166,930 | 11/1992 | Braff et al. | 370/94.1 |
| 5,184,346 | 2/1993 | Kozaki et al. | 370/60 |
| 5,233,606 | 8/1993 | Pashan et al. | 370/85.6 |

OTHER PUBLICATIONS

Proceeding of the 1990 International Switching Symposium, May 21–Jun. 1, 1990, pp. 21–26, vol. V, Takeo Koinuma, et al., "AN ATM SWITCHING SYSTEM BASED ON A DISTRIBUTED CONTROL ARCHITECTURE".

IEEE Journal of Solid–State Circuits, vol. 27, No. 7, Jul. 1992, pp. 1116–1120, Alain Chemarin, et al., "A HIGH-SPEED CMOS CIRCUIT FOR 1.2-Gb/s 16 × 16 ATM SWITCHING".

1990 Symposium on VLSI Circuits, 1990, pp. 109–110, Ichiro Okabayashi, et al., "A PROPOSED STRUCTURE OF A 4MBIT CONTENT-ADDRESSABLE AND SORTING MEMORY".

Primary Examiner—Hassan Kizou
Attorney, Agent, or Firm—Oblon, Spivak, McClelland, Maier & Neustadt

[57] ABSTRACT

In order to obtain a buffer control shift register for an ATM switching unit for transmitting ATM cells which are stored in the unit while controlling the same in response to deadlines thereof, the unit comprises a comparator (53) for comparing dispatch times $DPT_0$ of inputted ATM cells with those stored in a register (51). Registers (50, 51) are formed to be capable of bidirectional shifting (positive and negative directions along $\gamma$). A shift/write control (54) rearwardly shifts data having a larger dispatch time in response to the result of comparison of the comparator (53), to write data of the inputted ATM cells in the vacated portion. It is possible to sequence data of the shift register from the frontmost stage in order of the dispatch times.

20 Claims, 30 Drawing Sheets

PRIORITY PROCESSING OF ATM CELLS USING SHIFT REGISTER STAGES

BACKGROUND OF THE INVENTION

1. Field of the Invention

The present invention relates to hardware for priority processing in a communication device interchanging information in hardware which is employed for packet communication or the like, and more particularly, it relates to a buffer control memory which is employed in a digital communication device interchanging information in ATM (asynchronous transfer mode) hardware or the like.

2. Background of the Invention

FIG. 25 is a conceptual diagram for illustrating an ATM system which is described in "An ATM Switching System Based on a Distributed Control Architecture" by T. Koinuma et al., 1990 International Switching Symposium, May 27th–June 1st, Stockholm, Sweden, for example.

Referring to FIG. 25, numeral 1 denotes an ATM network which is formed by an OAM (operation, administration and maintenance) network, an intelligent network and a transmission network, numeral 2 denotes ATM switching units for forming the transmission network of the ATM network 1, and numeral 3 denotes user network interfaces (hereinafter referred to as UNIs) for connecting devices of users with the ATM network 1. Numeral 4 denotes a local area network of a user which is connected with the ATM network 1 by the UNI 3, numeral 5 denotes multimedia work stations of users which are connected with the ATM network 1 by the UNIs 3, numeral 6 denotes a video conference of a user which is connected with the ATM network 1 by the UNI 3, numeral 7 denotes units for assembling/disassembling cells, numeral 8 denotes existent networks such as N-ISDN which are connected with the ATM network 1 through the units 7, and numeral 9 denotes a private network which is connected with the ATM network 1 through the unit 7.

In general, there are requirements for making various communication operations through the ATM network 1. Namely, there are requirements for interconnection between the LAN 4 and other LANs, bulk file transfer between the multimedia work stations 5 each other, and the video conference 6 with combination of picture and sound data through the ATM network 1. Thus, the ATM network 1 is extremely dispersed in holding times of such communication operations, communication information generation characteristics (traffic characteristics) and the like.

In the ATM network 1, all data are carried on the transmission network through fixed length packets called cells. Each cell is formed by a header part and an information field part, and the header part stores an identifier indicating the destination. Each ATM switching unit 2 identifies the destination through the identifier which is stored in the header part, to transfer each cell. The OAM network is adapted to transmit information for maintaining/controlling the ATM network 1. In general, the OAM network is formed by a virtual network for transmitting information by OAM cells which are transmitted on the transmission network of the ATM network 1.

In order to implement a basic ATM switching function, each ATM switching unit 2 comprises a cell interconnection module (hereinafter referred to as CIM) 10 for controlling large flow of cells between the module and a line, a cell switching module (hereinafter referred to as CSM) 11 for making multiplex communication through a cell transmission hierarchy which is different from that of the CIM 10 and the like, for example.

FIG. 26 illustrates an exemplary CIM 10. The CIM 10 shown in FIG. 26 performs three-stage switching operations, and is provided therein with four first switching elements 12 receiving cells from other CSMs 11, four second switching elements 13 receiving the cells from the first switching elements 12, and four third switching elements 14 receiving the cells from the second switching elements 12 and transmitting the same to other CSMs 11. Each switching unit has 4 by 4 ports. Thus, each CIM 10 switches 64 links in each hierarchy.

A plurality of ATM cells which are transmitted on the ATM network 1 shown in FIG. 25 are stored in each switching unit. Each ATM switching unit sorts the respective ATM cells to the destinations thereof, so that the ATM cells are finally successively outputted from the CIM 10 to outgoing lines corresponding to the destinations. The cells are inputted from the CSMs 11 in the first switching elements 12 and outputted from the third switching elements 14 to the CSMs 11 at a fixed transmission speed of about 155 Mb/s, for example. The cells are transmitted between the first switching elements 12 and the second switching elements 13 as well as between the second switching elements 13 and the third switching elements 14 at variable transmission speeds of not more than 620 Mb/s.

FIG. 27 illustrates the structure of each ATM switching element, which is a principal part forming the ATM switching unit 2. Referring to FIG. 27, numeral 21 denotes four input interface blocks which are connected to an input line 20, numeral 22 denotes a common buffer and control block, and numeral 23 denotes four output interface blocks which are connected to an outgoing line 24.

Each input interface block 21 comprises a receiving interface 21a, a filter 21b for selecting cell data, a FIFO buffer 21c for storing the cell data, and an input/write control part 21d for controlling the receiving interface 21a, the filter 21b and the FIFO buffer 21c. Each input interface block 21 receives the cell data in a 4-bit parallel manner.

The common buffer and control block 22 comprises 31 buffers, a write arbiter 22b, a read arbiter 22c and an empty buffer queue 22d. This common buffer and control block 22 receives write requests and the cell data from the input interface blocks 21, to store the cell data in buffers having buffer numbers stored in the empty buffer queue 22d.

Each output interface block 23 comprises a FIFO buffer 23a, a transmission interface 23b, a read/output control part 23c for controlling the FIFO buffer 23a and the transmission interface 23b, and an output queue 23d for storing buffer numbers storing outputted cell data. The output queue 23d is provided in correspondence to an output port. Since the cell data have destination data, the output queue 23d corresponding to the port for outputting written cell data is supplied with the buffer numbers in which the cell data are written from the input/write control part 21d. Each output interface block 23 supplies the numbers of the buffers from which the data are read to the empty buffer queue 22d after the cell data are outputted.

The cells arriving at the ATM switching unit 2 are switched by the ATM switching elements 12, 13 and 14, and transmitted to outgoing lines corresponding to data of the destinations held by the cells.

Description is now made on the structure of another ATM switching element. FIGS. 28 to 31 show the structure and the operation of an ATM switching element which is described in "A High-Speed CMOS Circuit for 1.2 Gb/s 16×16 ATM Switching" by Alain Chemarin et al., IEEE Journal of Solid-State Circuits, Vol. 27, July 1992, for example.

FIG. 28 is a block diagram showing the structure of the ATM switching element. Referring to FIG. 28, numeral 25 denotes 16 receiving control blocks which are provided in correspondence to 16 inputs, numeral 26 denotes seven ATM switching parts which are provided by processing 28 divided input signals every four bits, numeral 27 denotes transmission control blocks for assembling the 28 divided output signals outputted from the ATM switching parts 26 for allowing transmission and outputting the same, numeral 28 denotes a header processing part for processing the headers of the respective cells as received, and numeral 29 denotes a control circuit part for generating write addresses and read addresses corresponding to processing results received from the header processing part 28. Extra headers are further added to heads of the header parts of the cell data as inputted, for controlling processing performed in the ATM switching unit.

FIG. 29 is a block diagram showing the structure of each ATM switching element 26 shown in FIG. 28. Referring to FIG. 29, numeral 30 denotes incoming rotating matrix block for serial-to-parallel converting the cell data as inputted, numeral 31 denotes a memory device which is divided into 16 banks for storing the cell data, numeral 32 denotes outgoing rotating matrix block for parallel-to-serial converting the cell data to original forms, numeral 33 denotes delaying block for delaying the write addresses for processing the header parts, numeral 34 denotes write address registers having shift register structures for supplying the write addresses for making the cell data stored in the memory device 31, numeral 35 denotes read address registers having shift register structures for supplying read addresses for reading the cell data from the memory device 31, and numeral 36 denotes signaling block for indicating vacated addresses.

FIG. 30 is a block diagram for illustrating the structure of the control circuit part 29 shown in FIG. 28. Referring to FIG. 30, numeral 36 denotes address management block for outputting write addresses, numeral 37 denotes multicasting calculation block for transmitting a single inputted cell to a plurality of destinations, numeral 38 denotes 16 queues of FIFO structures which are provided in correspondence to outgoing lines for outputting read addresses, numeral 39 denotes a queue for indicating empty addresses capable of supplying write addresses to the address management block 36, numeral 40 denotes signalling insertion & extraction block for indicating addresses which may generate write addresses, and numeral 41 denotes control logic.

Since the queues 38 are in FIFO structures, the respective outgoing lines output the cell data in order of the addresses stored in the queues 38. In a multicasting operation of outputting the same cell data on a plurality of outgoing lines, the multicasting calculation block 37 copies the queues 38 and hence the plurality of queues 38 corresponding to different outgoing lines output the same read addresses respectively. Thus, it is possible to transmit a single ATM cell which is inputted in the ATM switching unit to a plurality of outgoing lines.

FIG. 31 illustrates the flow of the cell data. Referring to FIG. 31, numerals identical to those in FIG. 30 denote the same elements. In the flow shown in FIG. 31, the cell data inputted in an input J are transmitted from an output N, while those inputted from an input I are multicasted and transmitted from outputs L and N.

The ATM network 1 shown in FIG. 25 is controlled by the OAM network etc. so that the ATM cells arrive at the destinations within a prescribed time. In order to hold a video conference through the ATM network 1, for example, it is necessary to transmit information with minimum delay, even if the quality of the information is deteriorated. In order to transfer data between work stations, on the other hand, the quality of the information comes into question in relation to errors or the like while the transmission speed for the information may be regarded as less important. Further, the ATM network 1 may temporarily burst until such data over the transmission quantity of the ATM network 1. In the ATM network 1, therefore, it is necessary to control the stay times of cells in the ATM switching unit 2 etc. in response to the information contents, communication situation or the like, depending on the busy condition of the ATM network 1.

Generally known is a method of controlling the information stay times by introducing a concept of delay priority for a request for making cells arrive at destinations within a prescribed time and separately controlling calls requiring immediate processing and allowing a certain degree of delay respectively. For example, an apparatus allowing delay priority is shown in NTT R & D, No. 3, Vol. 42, 1993, p. 412, FIG. 7. This apparatus carries out bilevel priority control through a first priority buffer and a second priority buffer.

In a conventional network for packet communication such as the ATM network having the aforementioned structure, the cells are outputted in order of arrival in the switching system such as the ATM switching unit 2, for example, and hence the cells passing through the ATM switching unit 2 may not arrive at the destinations within a prescribed time.

Even if the concept of delay priority is introduced, this problem cannot be sufficiently solved since a determination is made only as to priority and no control is made on arrival times of priority cells and non-priority cells.

SUMMARY OF THE INVENTION

According to a first aspect of the present invention, shift register having a priority processing function comprises a plurality of ordered registers which are provided for storing a plurality of data respectively and include regions for storing degrees of precedence of the data to be outputted, comparison means for comparing the degrees of precedence of the data which are stored in the register stages with that of newly inputted data, and control means for storing the newly inputted data in the register stages so that all data including the newly inputted data are stored in the register stages successively along the degrees of precedence in correspondence to the order of the register stages on the basis of results of the comparison in the comparison means, while the register stages are forwardly shifted for outputting the data which are stored therein in the order of the register stages.

According to the first aspect of the present invention, the comparison means compares the degrees of precedence of the data which are stored in the register stages with that of newly inputted data.

The register stages include the regions which are provided for storing a plurality of data respectively while storing degrees of precedence of the data, and are ordered. Thus, the control means makes the register stages store the newly inputted data on the basis of the results of comparison in the comparison means so that all data including the newly inputted data are stored in the register stages from that having the highest degree of precedence in correspondence to the order of the register stages.

The data stored in the register stages are ordered along the degrees of precedence by the control means, whereby it is possible to output the data stored in the register stages from that having the highest degree of precedence in accordance with the order of the register stages, by frontwardly shifting the register stages.

In the shift register having a priority processing function according to the first aspect of the present invention, as hereinabove described, the control means makes the newly inputted data stored in the register stages on the basis of the results of comparison of the comparison means so that all data including the newly inputted data are stored in the register stages from that having the highest degree of precedence in response to the order of the register stages and frontwardly shifts the register stages for outputting the data stored therein along the sequence order of the register stages, whereby it is possible to output the data in order of the degrees of precedence for allowing high-speed priority processing. Therefore, it is possible to apply the shift register to buffer control for a packet communication switching unit for performing priority processing, for example.

Preferably, each register stage includes a bidirectional register which can carry out a shift operation for either precedent or subsequent register stage for storing the data and the degree of precedence, each bidirectional resister includes a first bidirectional resister storing data having the degree of precedence lower than that of the newly inputted data, and the control means rearwardly shifts the first bidirectional registers for transferring all data currently stored in the first bidirectional registers from the register stages currently storing the same to subsequent register stages, for obtaining at least one vacated register stage to write the newly inputted data.

According to the first aspect of the present invention, the register stages include bidirectional registers which can carry out shift operations with respect to both of precedent and subsequent register stages, as registers for storing the data and the degrees of precedence.

The control means controls the register stages to which the first bidirectional registers belongs. For example, it is assumed that the control means shifts all data of the register stages under control to subsequent ones of the register stages respectively.

Thus, only register stages storing low precedence data rearwardly deviate one by one while those storing high precedence data are left intact. Therefore, it is possible to ensure an empty register stage between those having higher and lower degrees of precedence as compared with the newly inputted data, so that subscription on the empty register stage exerts no influence on the existent data. Thus, it is possible to readily sequence data of a plurality of register stages in order of degrees of precedence in a short cycle by writing the newly inputted data in the empty register stage.

In the shift register having a priority processing function according to the first aspect of the present invention, the register stages include bidirectional registers which can carry out shift operations with respect to both of precedent and subsequent register stages as regions for storing the data and the degrees of precedence while the control means rearwardly shifts the register stages storing low degrees of precedence to transfer all data having lower degrees of precedence than the newly inputted data to transfer the same to subsequent register stages thereby writing the newly inputted data in a vacated register stage, whereby it is possible to readily implement the shift register having a priority processing function in a simple structure.

Preferably, the shift register employs deadlines for outputting the data as the degrees of precedence.

According to the first aspect of the present invention, the comparison means employs deadlines as the degrees of precedence and compares the deadlines of the data stored in the register stages with that of the newly inputted data. The control means employs the deadlines for outputting the data as the degrees of precedence, and sequences the data which are stored in the plurality of register stages from that having the closest deadline. Thus, the shift register can output the data successively from that having the closest deadline to an empty register stage which may not be frontwardly shifted.

In the shift register having a priority processing function according to the first aspect of the present invention, the deadlines for outputting the data are employed as the degrees of precedence, whereby it is possible to carry out deadline scheduling for controlling outputs by the deadlines.

Preferably, each register stage further comprises indicating means for indicating whether or not the register stage is vacant, and gate means for controlling supply of a clock for making the register stage carry out the frontward shift operation in response to the indication of the indicating means.

According to the first aspect of the present invention, the gate means controls supply of the clocks for frontwardly shifting the register stages in response to the indication of the indicating means indicating whether or not the register stages are vacant. Thus, it is possible to stop supply of the clocks to an empty register stage which may not be frontwardly shifted.

In the shift register having a priority processing function according to the first aspect of the present invention, the gate means can control supply of the clocks for frontwardly shifting the register stages in response to indication of the indicating means indicating whether or not the register stages are vacant, whereby it is possible to suppress power consumption by stopping unnecessary clocks for frontwardly shifting the shift registers.

Preferably, each register stage further includes indicating means for indicating whether or not the register is vacant, and gate means for controlling supply of a clock for making the register stage carry out the rearward shift operation in response to the indication of the indicating means.

According to the first aspect of the present invention, the gate means controls supply of the clocks for rearwardly shifting the register stages in response to the indication of the indicating means indicating whether or not the register stages are vacant. Thus, it is possible to stop supply of the clocks to an empty register stage which may not be rearwardly shifted.

In the shift register having a priority processing function according to the first aspect of the present invention, the gate means can control supply of the clocks for rearwardly shifting the register stages in response to indication of the indicating means indicating whether or not the register stages are vacant, whereby it is possible to suppress power consumption by stopping unnecessary clocks for rearwardly shifting the shift registers.

Preferably, the degrees of precedence which are stored in all register stages are set in lowest states in initialization.

According to the first aspect of the present invention, the degrees of precedence of all register stages are set at the lowest states in initialization, whereby newly inputted data is necessarily inserted in advance of the register stages which are set at the low precedence states. Thus, the data are successively inserted from the frontmost column of the plurality of registers. However, it is assumed that the newly inputted data is not supplied with the lowest precedence state.

In the shift register having a priority processing function according to the first aspect of the present invention, it is possible to sequence the data inputted after initialization in the register stages from the frontmost one without providing specific means by setting the degrees of precedence stored by all register stages in the lowest states, whereby the shift register can be simplified in structure.

Preferably, each register stage includes a region for storing information indicating its vacancy.

According to the first aspect of the present invention, each register state includes the region indicating its vacancy, whereby it is not necessary to provide a structure for checking the data and the degree of precedence stored in this register stage for deciding whether or not the register stage is empty.

In the shift register having a priority processing function according to the first aspect of the present invention, each register includes the region storing information indicating that the same is vacant, whereby the structure can be simplified.

Preferably, the shift register further comprises clock control means for controlling the clock which is supplied to each register stage on the basis of the information on its vacancy which is indicated by the indicating means of each register stage.

According to the first aspect of the present invention, the clock control means controls the clocks supplied to the register stages on the basis of the information indicated by the indicating means of the register stages indicating vacancy. Thus, it is possible to form the clock control means which can stop supply of the clocks to an empty register stage which may be neither frontwardly nor rearwardly shifted in a simple structure.

The shift register having a priority processing function according to the first aspect of the present invention comprises the clock control means for controlling the clocks supplied to the register stages on the basis of the vacancy information indicated by the indicating means of the register stages, whereby it is possible to stop supply of the clocks to unnecessary empty stages in a simple structure, thereby reducing power consumption.

Preferably, the shift register further comprises decision means for deciding whether or not the data stored in the register stages are discarded through the degrees of precedence stored therein, and discard means for making the indicating means of those of the register stages which are decided to be discarded by the decision means indicate vacancy thereof.

According to the first aspect of the present invention, the decision means decides whether or not the data stored in the register stages are discarded through the degrees of precedence stored therein respectively. When the data cannot be outputted in response to the degrees of precedence, for example, the decision means decides that the data can be discarded. The discard means can reduce influences exerted by the data which cannot satisfy the degrees of precedence on processing of other data by making the indicating means of the register stages having the data decided by the decision means to be discarded display vacancy thereof.

The shift register having a priority processing function according to the first aspect of the present invention comprises the decision means for deciding whether or not the data stored in the register stages are discarded in response to the degrees of precedence which are stored in the register stages and the discard means for making the indicating means of the register stages decided by the decision means to be discarded display vacancy thereof, whereby it is possible to reduce influence exerted by data incapable of satisfying degrees of precedence on other data for allowing flexible correspondence when the degrees of precedence of all data cannot be satisfied due to a number of data simultaneously existing in the shift register, for example.

Preferably, the data include those which are supplied with discard priority specification indicating whether or not the same may be discarded, and the decision means regards the discard priority specification also as reference for deciding whether or not the data are discarded, in addition to the degrees of precedence.

According to the first aspect of the present invention, the data are supplied with discard priority specification indicating whether or not the same can be discarded. Thus, it is possible to specify the data not to be discarded. Therefore, the decision means can prevent discarding of necessary data by regarding the discard priority specification also as reference for deciding whether or not the data are discarded in addition to the degrees of precedence.

In the shift register having a priority processing function according to the first aspect of the present invention, the decision means regards the discard priority specification included in the data indicating whether or not the data can be discarded and the degrees of precedence as reference for deciding whether or not the data are discarded, whereby it is possible to prevent the necessary data from being discarded for enabling high quality communication.

Preferably, the shift register further comprises substitution means for frontwardly shifting the data of subsequent register stages and substituting the same in those of the register stages which are vacated by the discard means.

According to the first aspect of the present invention, the subscription means shifts and subscripts the data of the subsequent register stages for storing effective data in the register stages vacated by the discard means which may be sprinkled among the non-vacant register stages. Thus, it is possible to eliminate sprinkled vacant register stages so that the vacant register stages are collected in a rear column.

The shift register having a priority processing function according to the first aspect of the present invention comprises the subscription means for shifting the data of the subsequent register stages to the register stages which are vacated by the discard means and subscripting the same therein, whereby it is possible to prevent sprinkling of register stages vacated by the discard means among full register stages, thereby increasing the speed for outputting the remaining data.

The present invention is also directed to a packet communication switching unit. According to a second aspect of the present invention, a packet communication switching unit employs the shift register having a priority processing function according to the first aspect of the present invention in which the data stored in the shift register include data related to inputted packets, and comprises conversion means for converting the degrees of precedence to cyclic expression including section bits and supplying the same to the shift register, while the comparison means of the shift register carries out the comparison through the cyclic expression of the degrees of precedence.

According to the second aspect of the present invention, the conversion means converts the degrees of precedence which are supplied to the inputted packets to cyclic expression including section bits and supplies the same to the shift register. It is possible to express the degrees of precedence with a small number of bits due to the cyclic expression, whereby the register stages can be reduced in storage capacity for storing the degrees of precedence. The comparison means for making comparison through the cyclic expression of the degrees of precedence can be structured in response to a small number of bits, whereby its scale can be reduced.

The packet communication switching unit according to the second aspect of the present invention comprises the conversion means for converting the degrees of precedence to cyclic expression including section bits and supplying the same to the shift register so that the comparison means makes comparison through the cyclic expression of the degrees of precedence, whereby it is possible to reduce the storage capacity of the shift register for miniaturizing the unit.

Preferably, each register stage of the shift register includes a region storing information indicating its vacancy.

According to the second aspect of the present invention, each register stage includes the region for storing information indicating its vacancy, whereby no structure for displaying vacancy in a region storing the degree of precedence is necessary and the conversion means and/or the register stages can be simplified in structure.

In the packet communication switching unit according to the second aspect of the present invention, each of the register stages of the shift register includes the region for storing the information indicating its vacancy, whereby the conversion means and/or the register stages can be simplified in structure thereby simplifying the shift register in structure.

According to a third aspect of the present invention, a packet communication switching unit employs the shift register having a priority processing function according to the first aspect of the present invention in which the data stored in the shift register include data related to inputted packets, and comprises precedence supply means having a conversion table for making correspondence between destinations of the packets and the degrees of precedence for supplying the shift register with information of the degrees of precedence which are responsive to the destinations of the packets.

According to the third aspect of the present invention, the precedence supply means has the conversion table making correspondence between the destinations of the packets and the degrees of precedence for supplying the shift register with the information of the degrees of precedence responsive to the packet destinations. Therefore, it is possible to supply the packets with proper degrees of precedence in response to the situation by properly setting the conversion table in the situation of the packet communication switching unit.

The packet communication switching unit according to the third aspect of the present invention comprises the precedence supply means having the conversion table making correspondence between the destinations of the packets and the degrees of precedence for supplying the shift register with the information of the degrees of precedence responsive to the packet destinations, whereby it is possible to make the communication switching unit efficiently carry out packet transmission by properly setting the conversion table.

Preferably, the packet communication switching unit according to the second or third aspect of the present invention employs deadlines for outputting the packets as the degrees of precedence.

According to the second or third aspect of the present invention, the shift register can output the ATM cells successively from that having the closest deadline. The ATM network can provide the deadlines corresponding to the everchanging situation to the ATM cells for outputting the same from that having the closest deadline by changing the conversion table for supplying the deadlines in response to the contents of the OAM cells.

In the packet communication switching unit according to the second or third aspect of the present invention, the deadlines for outputting the packets are employed as the degrees of precedence, whereby it is possible to carry out deadline scheduling for controlling outputs by the deadlines for outputting the packets from the packet communication switching unit thereby properly coping with the busy condition of the unit.

The present invention is also directed to an ATM network. According to a fourth aspect of the present invention, an ATM network employs the shift register having a priority processing function according to the first aspect of the present invention, and comprises an ATM switching unit which is controlled by OAM cells and provided with precedence supply means having a conversion table for making correspondence between destinations of inputted ATM cells and the degrees of precedence for supplying the shift register with information of the degrees of precedence which are responsive to the destinations of the ATM cells through the conversion table, while the data stored in the shift register include data related to the ATM cells which are inputted in the ATM switching unit, and the conversion table is changed in response to the contents of the OAM cells.

According to the fourth aspect of the present invention, the ATM switching unit supplies the shift register with the information of the degrees of precedence which are responsive to the destinations of the ATM cells through the conversion table making correspondence between the destinations of the inputted ATM cells and the degrees of precedence through the precedence supply means. The data stored in the shift register include the data of the ATM cells inputted in the ATM switching unit, whereby the shift register can output the ATM cells in order of the degrees of precedence. Thus, the ATM switching unit can provide the deadlines corresponding to the situation thereof to the ATM cells for outputting the same from that having the closest deadline by changing the conversion table for supplying the deadlines in response to the contents of the OAM cells.

The ATM network according to the fourth aspect of the present invention comprises the ATM switching unit which is controlled by OAM cells and provided with the precedence supply means having the conversion table making correspondence between destinations of the inputted ATM cells and the degrees of precedence for supplying precedence information responsive to the destinations of the ATM cells to the shift register by the conversion table, and changes the conversion table in response to the contents of the OAM cells, whereby it is possible to properly change the conversion table in response to the communication situation for allowing efficient packet transmission in the communication switching unit.

Preferably, the ATM network employs deadlines for outputting the ATM cells from the ATM switching unit as the degrees of precedence.

According to the fourth aspect of the present invention, the shift register can output the ATM cells successively from that having the closest deadline. The ATM network can provide the deadlines corresponding to the ever-changing situation to the ATM cells for outputting the same from that having the closest deadline by changing the conversion table for supplying the deadlines in response to the contents of the OAM cells.

In the ATM network according to the fourth aspect of the present invention, the deadlines for outputting the ATM cells from the ATM switching unit are employed, whereby it is possible to carry out deadline scheduling for controlling the ATM cells by the deadlines for outputting the same from the ATM switching unit, whereby the ATM network can properly cope with the busy condition thereof.

The present invention is also directed to a packet communication system. According to a fifth aspect of the present invention, a packet communication system accompanied with priority processing comprises the steps of preparing a packet communication switching unit having supply means for supplying deadlines to packets in accordance with a conversion table of the deadlines and destinations, as well as a plurality of register stages including both of registers storing the deadlines of the packets and data registers for storing data which are related to the packets having the deadlines, supplying the deadline to a newly inputted packet which is newly inputted in the packet communication switching unit through the conversion table and holding the newly inputted packet in the packet communication switching unit, comparing the deadline of the newly inputted packet with those of the packets which are precedently stored in the packet communication switching unit, storing the deadline and the data related to the newly inputted packet in the register stage and sequencing the data of the plurality of register stages including the data which are related to the newly inputted packet in order of the deadlines, and transmitting the packet corresponding to the data of the register stage storing the closest deadline from the packet communication switching unit.

According to the fifth aspect of the present invention, the packet newly inputted in the packet communication switching unit are provided with deadline in accordance with the conversion table of the supply means and held in the packet communication switching unit through the step of holding the packet in the packet communication switching unit.

The deadline and the data of the newly inputted packet are stored in the register stage through the comparison step and the step of comparison and sequencing the data in order of the deadlines, whereby the data of the plurality of register stages including those of the newly inputted packet are sequenced in order of the deadline.

The packet corresponding to the data of the register stage storing the closest deadline is transmitted from the packet communication switching unit through the transmission step.

Thus, the packets are successively transmitted from the ATM switching unit from that having the closest deadline supplied by the conversion table, whereby it is possible to supply deadlines which are suitable for the ATM switching unit to the ATM cells by properly setting the conversion table in response to the situation of the packet communication switching unit.

In the packet communication system accompanied with priority processing according to the fifth aspect of the present invention, it is possible to properly set the conversion table for transmitting the packets from the communication switching unit in order of the degrees of precedence, thereby making the communication switching unit efficiently carry out packet transmission.

According to a sixth aspect of the present invention, an ATM communication system accompanied with priority processing comprises the steps of preparing an ATM switching unit having supply means for supplying degrees of precedence to ATM cells in accordance with a conversion table of the degrees of precedence and destinations, as well as a plurality of register stages including both of registers storing output degrees of precedence of the ATM cells and data registers storing data related to the ATM cells having deadlines, and being controlled by OAM cells, changing the conversion table of the supply means by the OAM cells in response to prescribed conditions, supplying the degree of precedence to a newly inputted ATM cell which are newly inputted in the ATM switching unit through the conversion table and holding the ATM cell in the ATM switching unit, comparing the degrees of precedence of the newly inputted ATM cell with those of the ATM cells which are precedently stored in the ATM switching unit, storing the degrees of precedence and the data which are related to the newly inputted ATM cell in the register stage and sequencing the data of the plurality of register stages including the data related to the newly inputted ATM cell in order of the degrees of precedence, and transmitting the ATM cell corresponding to the data of the register stage storing the highest degree of precedence from the ATM switching unit.

According to the sixth aspect of the present invention, it is possible to properly change the conversion table of the supply means by the OAM cells in response to the situation of the ATM switching unit through the step of changing the conversion table.

An newly inputted ATM cell newly inputted in the ATM switching unit is supplied with a degree of precedence through the conversion table by the step of storing the newly inputted ATM cell in the ATM switching unit, while the degree of precedence and pointer related to the newly inputted ATM cell is stored in the register stages and data of a plurality of register stages including the data related to the newly inputted ATM cell are sequenced in order of the degrees of precedence through the comparing and sequencing steps.

The ATM cells are read from the ATM switching unit in accordance with the pointer shown by the register stage storing the highest degree of precedence through the reading step.

Thus, the data are outputted from the ATM switching unit successively from that having the highest degree of precedence supplied by the conversion table, whereby it is possible to supply degrees of precedence which are suitable for the situation of the ATM switching unit to the ATM cells by properly setting the conversion table in response to the situation of the packet communication switching unit by the OAM cells.

In the ATM communication system accompanied with priority processing according to the sixth aspect of the present invention, it is possible to make the ATM switching unit efficiently carry out packet transmission by properly setting the conversion table by the OAM cells in response to the situation of the packet communication switching unit.

Preferably, the ATM communication system employs deadlines for outputting the ATM cells from the ATM switching unit as the degrees of precedence.

According to the sixth aspect of the present invention, it is possible to properly change the conversion table of the supply means by the OAM cells in response to the situation of the ATM switching unit through the step of changing the conversion table.

The ATM cells newly inputted in the ATM switching unit are supplied with deadlines through the conversion table by the step of storing the ATM cells in the ATM switching unit, while the deadlines and pointers related to the newly inputted ATM cells are stored in the register stages and data of a plurality of register stages including the data related to the newly inputted ATM cells are sequenced from that having the closest deadline through the comparing and sequencing steps.

The ATM cells are read from the ATM switching unit in accordance with the pointer shown by the register stage storing the closest deadline through the reading step.

Thus, the data are outputted from the ATM switching unit successively from that having the closest deadline supplied by the conversion table, whereby it is possible to supply degrees of precedence which are suitable for the situation of the ATM switching unit to the ATM cells by properly setting the conversion table in response to the situation of the packet communication switching unit by the OAM cells.

In the ATM communication system accompanied with priority processing according to the sixth aspect of the present invention, the deadlines for outputting the ATM cells from the ATM switching unit are employed as the degrees of precedence, whereby it is possible to make the ATM switching unit efficiently carry out packet transmission by properly setting the conversion table by the OAM cells in response to the situation of the packet communication switching unit.

Accordingly, an object of the present invention is to provide a shift register having a priority processing function which can output data having high priority in advance among those having various degrees of precedence regardless of input order, such as a shift register having a priority processing function which can output ATM cells in an ATM network successively from those having high precedence regardless of order of the cells arriving at an ATM switching unit in order to cope with various busy conditions of the ATM network, for example, and to implement an ATM communication system accompanied with such priority processing.

Another object of the present invention is to provide a shift register having a priority processing function which is required for a switching unit of a network for packet communication such as an ATM switching unit carrying out deadline scheduling of controlling respective ATM cells in response to deadlines for outputting the cells from a prescribed ATM switching unit for making the same arrive at destinations within a prescribed time, and to implement an ATM communication system accompanied with priority processing which can cope with deadline scheduling.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
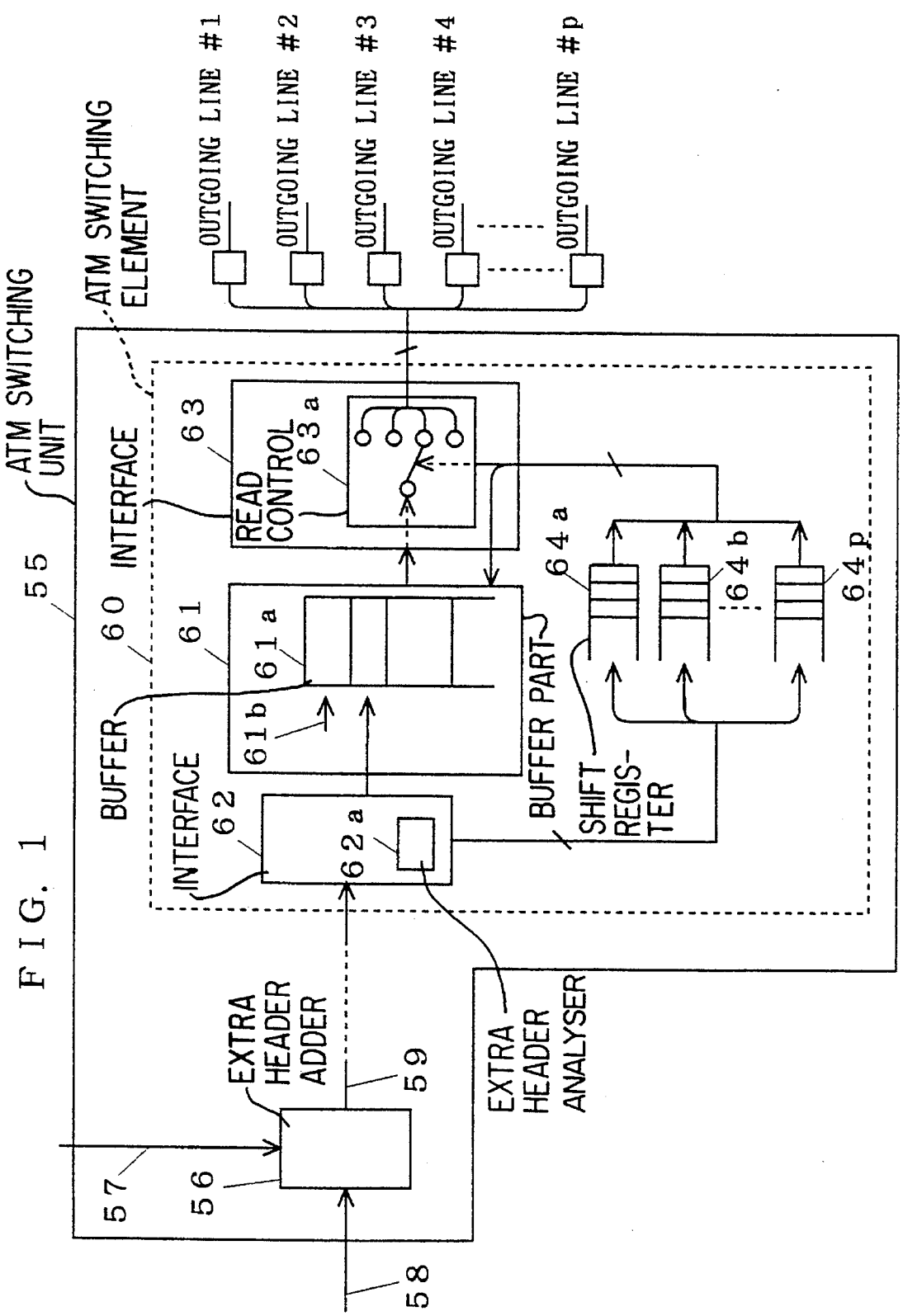
FIG. 1 is a block diagram showing the structure of an ATM switching unit according to a first embodiment of the present invention.

A first embodiment of the present invention is now described with reference to the drawings. FIG. 1 is a block diagram for schematically illustrating an ATM switching unit according to the first embodiment of the present invention. The ATM switching unit shown in FIG. 1 corresponds to the ATM switching unit 2 shown in FIG. 25, for example.

Figure 25:
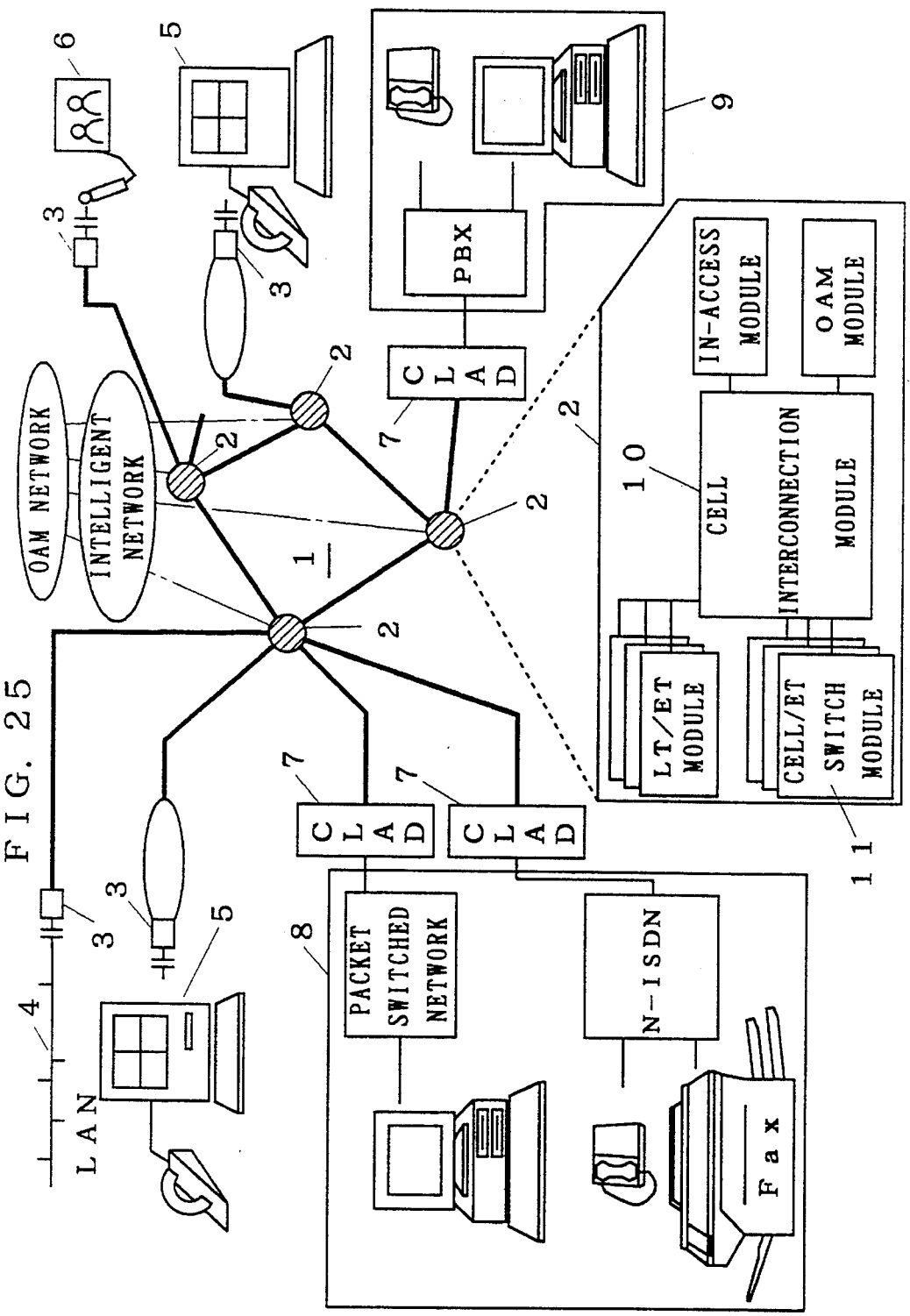
FIG. 25 is a block diagram for illustrating an ATM network.

The ATM cells inputted in the ATM network 1 through the UNIs 3 shown in FIG. 25 are to arrive at the destinations until predetermined times respectively. The predetermined times are various. Thus, the ATM cells arriving at the ATM switching unit 2 can stay therein at different permissible times. Assuming that Tin represents a time when a certain ATM cell arrives at the ATM switching unit 2 and Td represents a stayable time for the ATM cell in the ATM switching unit 2, the deadline when the certain ATM cell departures from the ATM switching unit 2 called a dispatch time (DPT) for the cell with respect to the ATM switching unit 2 is defined as DPT=Tin+Td.

Referring to FIG. 1, numeral 55 denotes an ATM switching unit for interchanging ATM cells 58, numeral 56 denotes an extra header adding part which is provided in the ATM switching unit 55 for adding extra headers to the ATM cells 58, and numeral 60 denotes an ATM switching element for storing the ATM cells 58 for interchange and sorting the same to a corresponding outgoing line.

The extra head adding part 56 allots the outgoing line to the ATM cell 58 on the basis of the destination of the header part of the ATM cell 58. This extra header adding part 56 is supplied with dispatch time data 57 which is related to the dispatch time from a controller through the OAM network shown in FIG. 25, for example. The extra head adding part 56 adds an extra header including the dispatch time data 57 and an outgoing line number to the ATM cell 58 on the basis of the dispatch time data 57, to output an ATM cell 59 having the extra header to the ATM switching element 60.

Figure 2:
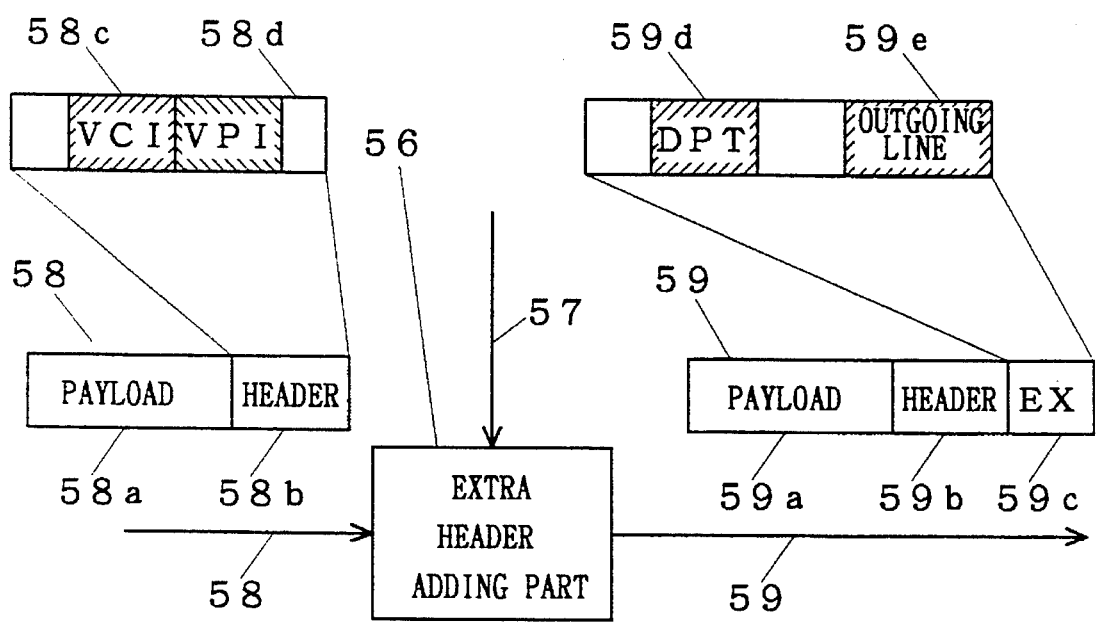
FIG. 2 is a diagram for illustrating input/output data in/from an extra header adding part shown in FIG. 1.

FIG. 2 is a diagram for illustrating the structures of the ATM cells 58 and 59 which are inputted in and outputted from the extra header adding part 56 respectively. The ATM cell 58 has a payload 58a in which user information is written and a header part 58b storing an identifier indicating the destination. Further, the ATM cell 58 has fields 58c and 58d called a virtual channel identifier (VCI) and a virtual path identifier (VPI) respectively in information of the header part 58b. On the other hand, the ATM cell 59 has a payload 59a and a header part 59b which are the same data as those of the ATM cell 58. The ATM cell 59 comprises information of an extra header 59c, including information 59e as to the outgoing line and information 59d as to the dispatch time DPT.

Figure 28:
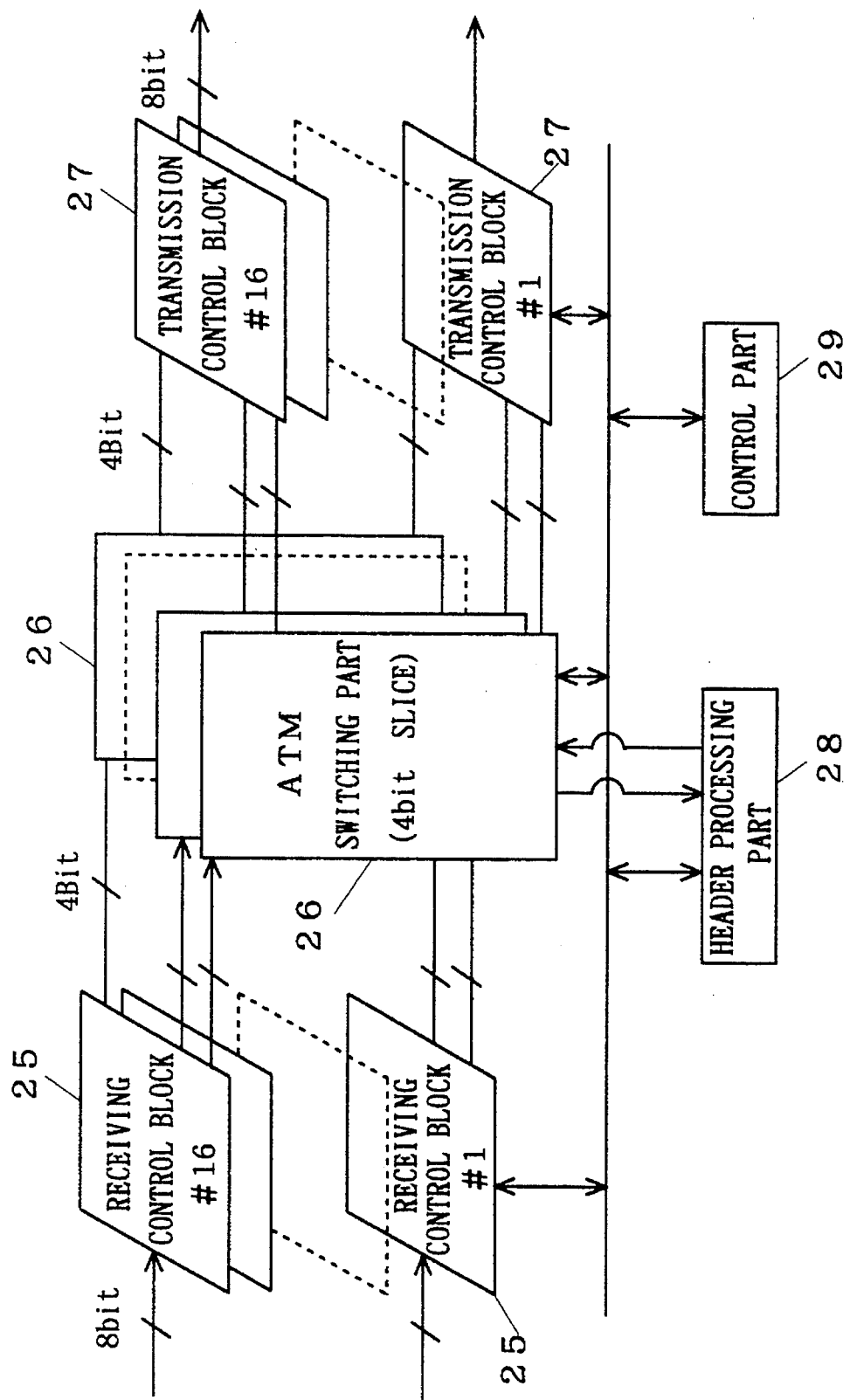
FIG. 28 is a block diagram for illustrating the structure of a conventional ATM switching element.

Specification of the stayable time Td in the extra header 59c is described. The conventional ATM switching unit shown in FIG. 26 or 28 obtains a physical outgoing line number on the basis of the VCI or VPI value of the ATM cell. Namely, the ATM switching unit has a correspondence table for obtaining outgoing line numbers corresponding to VCI/VPI values as shown in Table 1. Physical outgoing line numbers are obtained through the table, to be reflected on the extra headers. This also applies to the ATM switching unit 55 according to the first embodiment of the present invention.

In the ATM switching unit 55 according to this embodiment, further, another correspondence table is registered for obtaining stayable times Td corresponding to the VCI/VPI values shown in Table 1 through the OAM network shown in FIG. 25, i.e., OAM packets, in accordance with agreement between communication subscribers and the manager in starting of communication, similarly to the outgoing line numbers.

TABLE 1

| VPI/VCI value | Outgoing Line # | Td |
|---|---|---|
| 010001 . . . 01 | #2 | 4 |
| 100101 . . . 01 | #1 | 3 |
| . | . | . |
| . | . | . |
| . | . | . |
| . | . | . |
| 010001 . . . 10 | #2 | 4 |
| 000 . . . 10 | #3 | 5 |
| . | . | . |
| . | . | . |
| . | . | . |

The ATM switching element 60 has a buffer part 61 which is provided with a buffer 61a for storing cell data. The ATM switching element 60 also has an input interface 62 which is provided with an extra header analyzer part 62a for inputting the cell data, and an output interface 63 which is provided with a read control part 63a for transmitting the cell data. The ATM switching element 60 further comprises shift registers 64a to 64p for successively outputting read addresses of the cell data to be transmitted.

The shift registers 64a to 64p are provided in correspondence to outgoing lines #1 to #p, and successively output the read addresses to the buffer 61a and the read control part 63a in accordance with the order of the stored addresses, in order to convert the cell data stored in the buffer 61a to an ATM cell and transmit the same from the outgoing lines #1 to #p respectively.

The cell data received in the input interface 62 are first subjected to analysis of outgoing line numbers and dispatch times in the extra header analyzer part 62a. The outgoing line numbers are analyzed similarly to the prior art, while the dispatch times, which are data stored in the extra headers similarly to the outgoing line numbers, are also analyzed similarly to the outgoing numbers. The cell data are written in vacant regions of the buffer 61a, while write addresses thereof are inserted in the shift registers 64a to 64p of outgoing line numbers corresponding to the data of the extra headers along the order of the dispatch times.

When the data are transmitted, the output interface 63 is switched in the read control part 63a to outgoing lines for transmitting the data in correspondence to the shift registers from which the addresses are read. By the read addresses outputted from the shift registers 64a to 64p are specified addresses for reading the ATM cell data in the buffer 61a of the buffer part 61. In the shift registers 64a to 64p, the read addresses are sequenced successively from that having the closest dispatch time, whereby the same are successively outputted from that having the smallest dispatch time.

Figure 3:
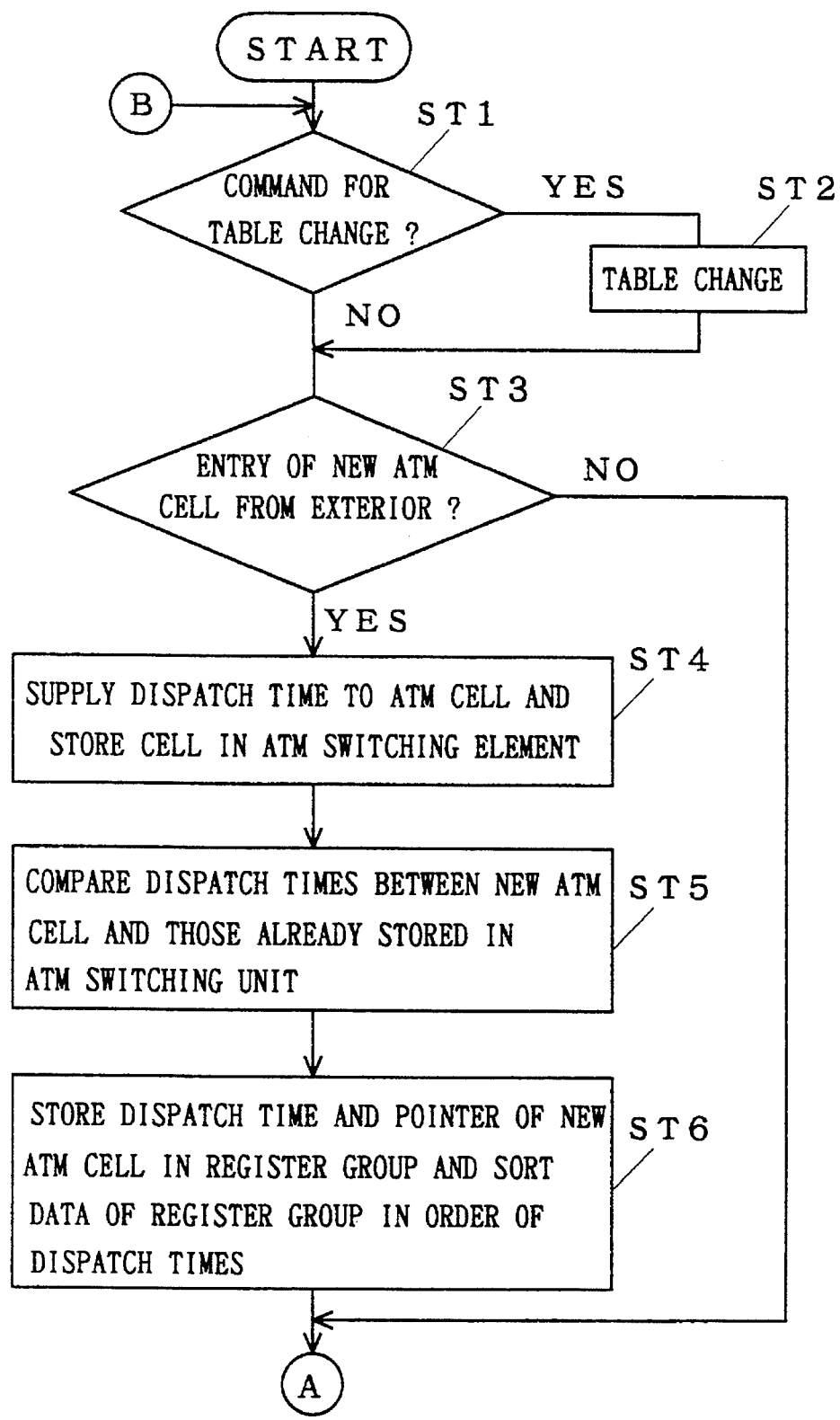
FIG. 3 is a flow chart for illustrating the operation of the ATM switching unit according to the first embodiment of the present invention.
Figure 4:
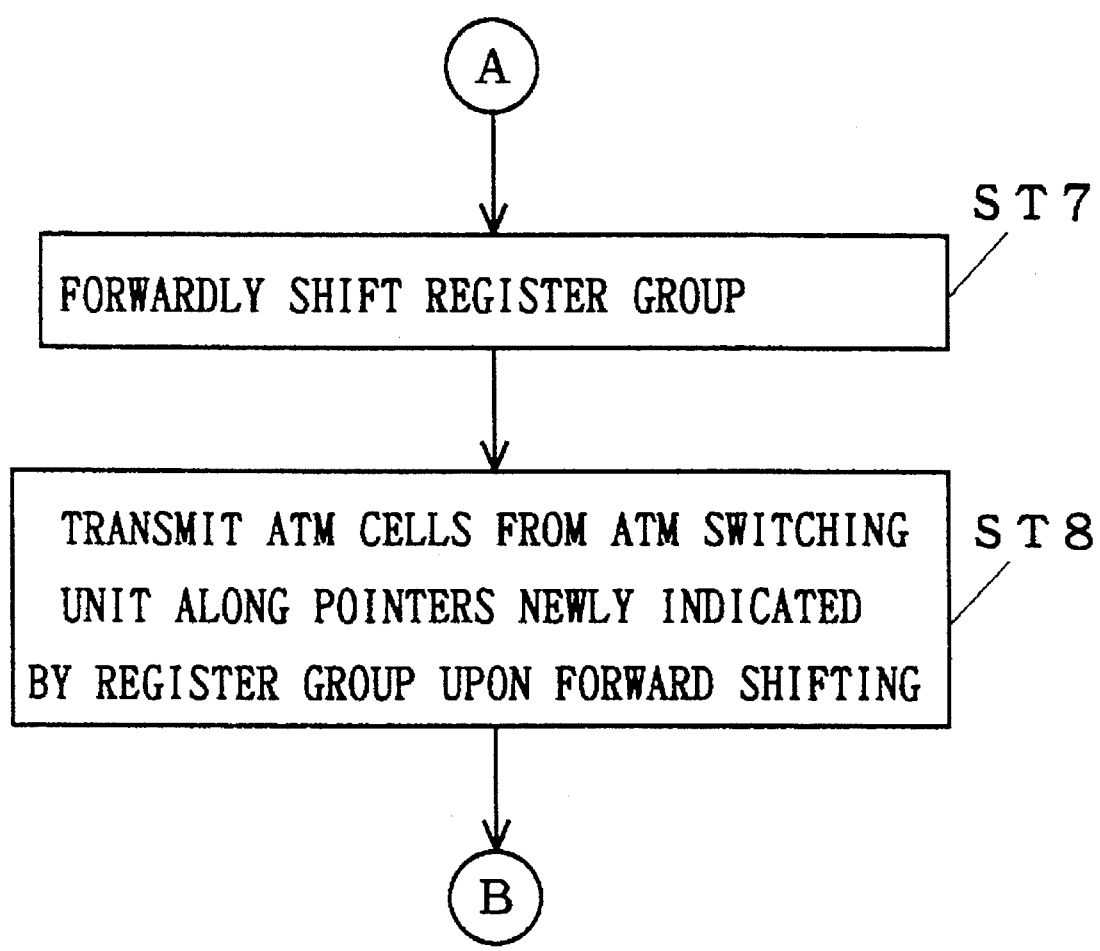
FIG. 4 is a flow chart for illustrating the operation of the ATM switching unit according to the first embodiment of the present invention.

A procedure of a packet communication method accompanied with deadline scheduling employing the aforementioned ATM network is now described with reference to flow charts shown in FIGS. 3 and 4.

A network is constructed by an ATM switching unit comprising supply means (the extra head adding part 56 in FIG. 1) for supplying dispatch times to ATM cells in accordance with a table (conversion table shown in Table 1, for example) set by the manager, and a register group (the shift registers 64a to 64p in FIG. 1) formed by registers storing deadlines and pointer registers indicating storage regions of the ATM cells having the deadlines.

This ATM network is employed when the ATM switching units determine whether or not there is a command for table change at a step ST1. If the determination is of yes, the ATM switching units go onto the job of a step ST2 to change the table, and thereafter go onto the job of a step ST3. If the determination at the step ST1 is of no, on the other hand, the process directly advances to the step ST3.

At the step ST3, a determination is made as to whether or not a new ATM cell is inputted from the exterior of the ATM switching unit 55. If the determination is of yes, the process advances to a step ST4. At the step ST4, a dispatch time is supplied to the ATM cell newly incoming to the ATM switching unit 55, and the ATM cell is stored in the ATM switching element 60. Then, the dispatch times of the newly incoming ATM cell and those already stored in the ATM switching unit 55 are compared with each other at a step ST5. Then, the dispatch time and a pointer of the newly incoming ATM cell are stored in the register group, so that the data of the register group are sorted in order of the dispatch times. Then, the process advances to a step ST7.

If the determination at the step ST3 is of no, the process directly advances to the step ST7 while jumping over the steps ST4 to ST6.

At the step ST7, the register group is made to carry out FIFO operations, for outputting pointers of ATM cells having small dispatch times since the ATM cells are sequenced in order of the dispatch times. At a step ST8, the ATM cells stored in the ATM switching unit 55 are transmitted in correspondence to the pointers newly indicated by the register group. Then, the process returns to the step ST1, to repeat the aforementioned procedure.

In the ATM switching unit 55 according to the first embodiment of the present invention, as hereinabove described, it is possible to transmit the cells from that having the smallest dispatch time regardless of the order of inputting the same in the ATM switching unit 55. Thus, deadline scheduling is enabled in the ATM network. Further, it is possible to change the degrees of precedence by changing the table, i.e., the dispatch times supplied to the ATM cells, in response to the situation, thereby carrying out efficient communication in response to various situations such that a specific cell must be delivered to its destination with minimum delay or cells are generated in a burst manner, without damaging high-speed transmission of the ATM network.

Further, it is possible to flexibly cope with a conventional priority processing system for implementing a first-come first-served operation by setting the dispatch times in a stylized manner as "input time+fixed offset", for example, and supporting delay priority of a plurality of levels by supplying fixed offset in response to degrees of precedence G of input cells such as "input time+fixed offset (G)", for example. When software-controllable design is made so that only portions provided with dispatch times require change and these portions are calculated by a processor in this case, no change is required for the remaining hardware.

While addresses are stored in the shift registers 64a to 64p with the dispatch times in the aforementioned ATM switching unit 55, the shift registers 64a to 64p may alternatively be provided with functions of the buffer 61a and the shift registers 64a to 64p, to store the cell data with the dispatch times.

Further, the degrees of precedence of ATM cell transmission are supplied by the dispatch times in the above description, the degrees of precedence may alternatively be supplied by other means, to attain an effect similar to that of the aforementioned embodiment by sequencing the ATM cells in the shift registers 64a to 64p.

In addition, the present invention may also be applied to a packet communication network other than the ATM network, to enable deadline scheduling by employment of the aforementioned shift registers 64a to 64p.

Figure 29:
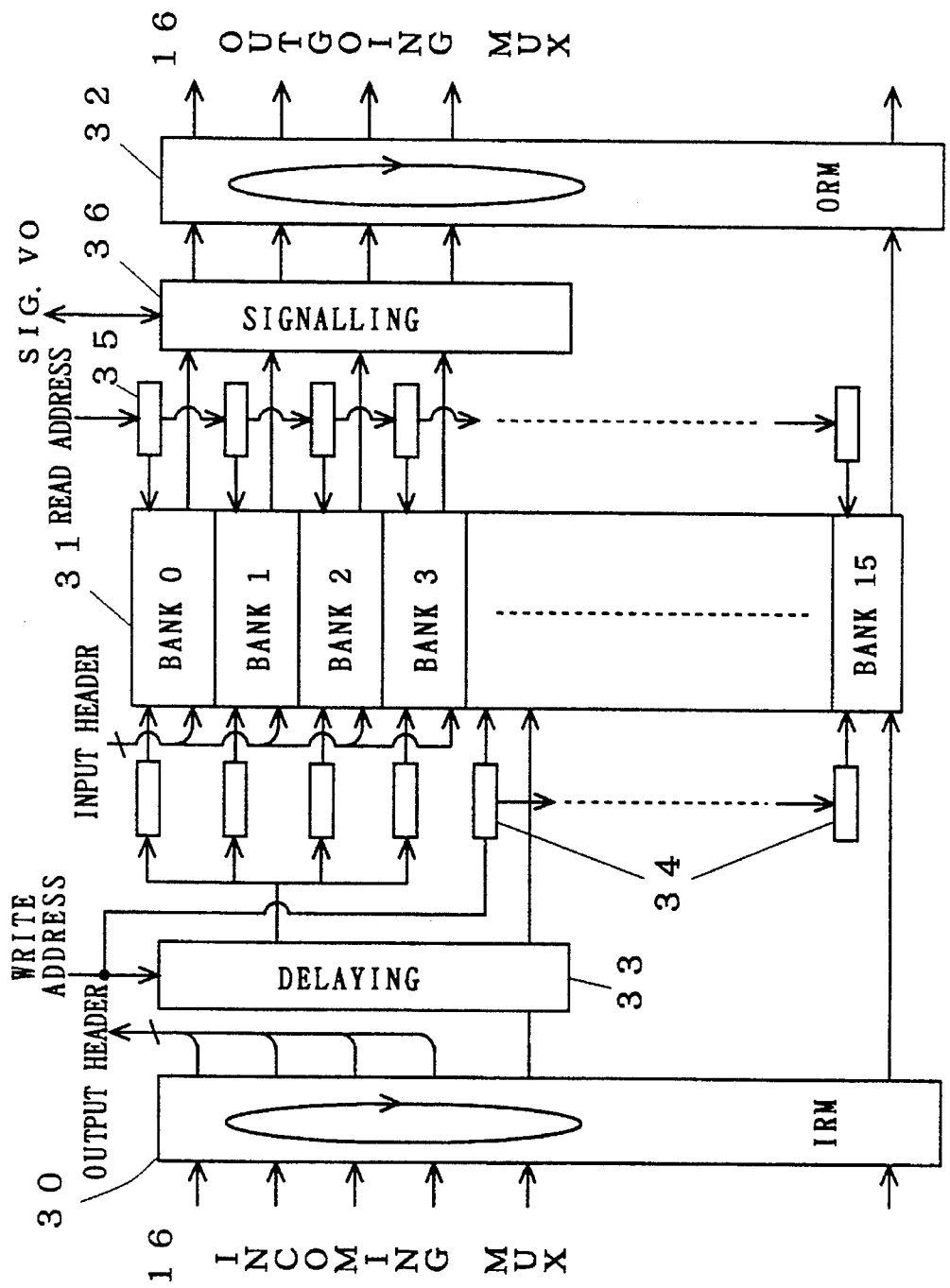
FIG. 29 is a block diagram for illustrating the structure of the conventional ATM switching element.

The buffer 61a is preferably formed by a dual access memory having two ports, i.e., the read port and the write port shown in FIG. 29 in view of a reliable operation, while the same may alternatively be formed by a memory having a port which is applied to read and write operations in common.

Figure 26:
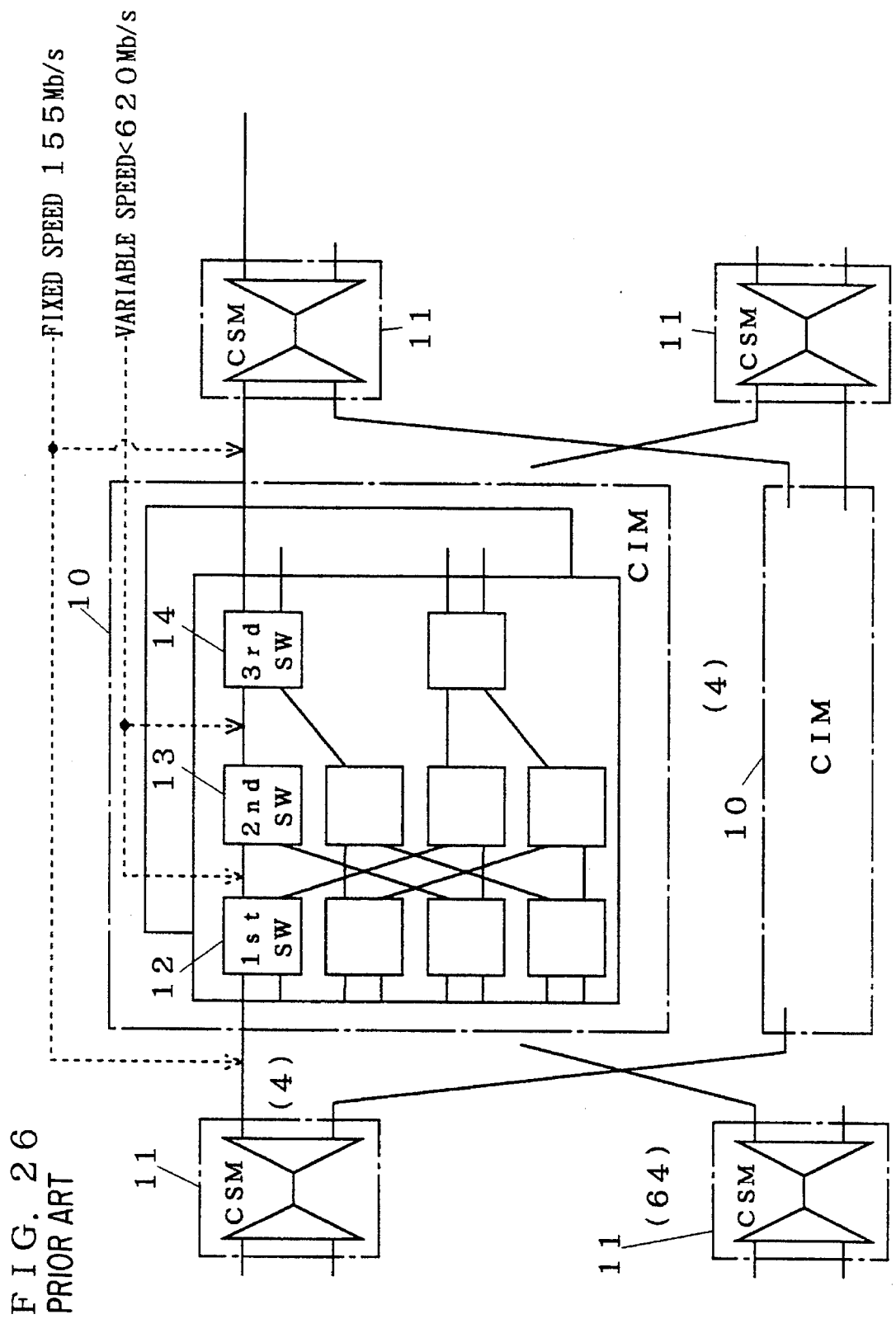
FIG. 26 is a block diagram for illustrating an ATM switching unit.

Further, ATM switching elements may be connected in a plurality of stages similarly to the first to third ATM switching elements 12 to 14 shown in FIG. 26. In this case, extra header adding parts are preferably provided for the respective ATM switching elements, so that stayable times Td can be controlled for the respective ATM switching elements.

While the aforementioned description has been made with respect to shift registers having priority processing functions which are employed in an ATM Switching unit, the same may also be employed for another packet communication in a packet communication switching unit utilizing not fixed length packet cells but variable length packet cells, for example. While the fixed length packet cells which are employed in the aforementioned ATM network require the extra header adding parts, header parts of the cells may be provided with information such as dispatch times in another packet communication system, to attain an effect similar to that of the aforementioned embodiment.

Figure 5:
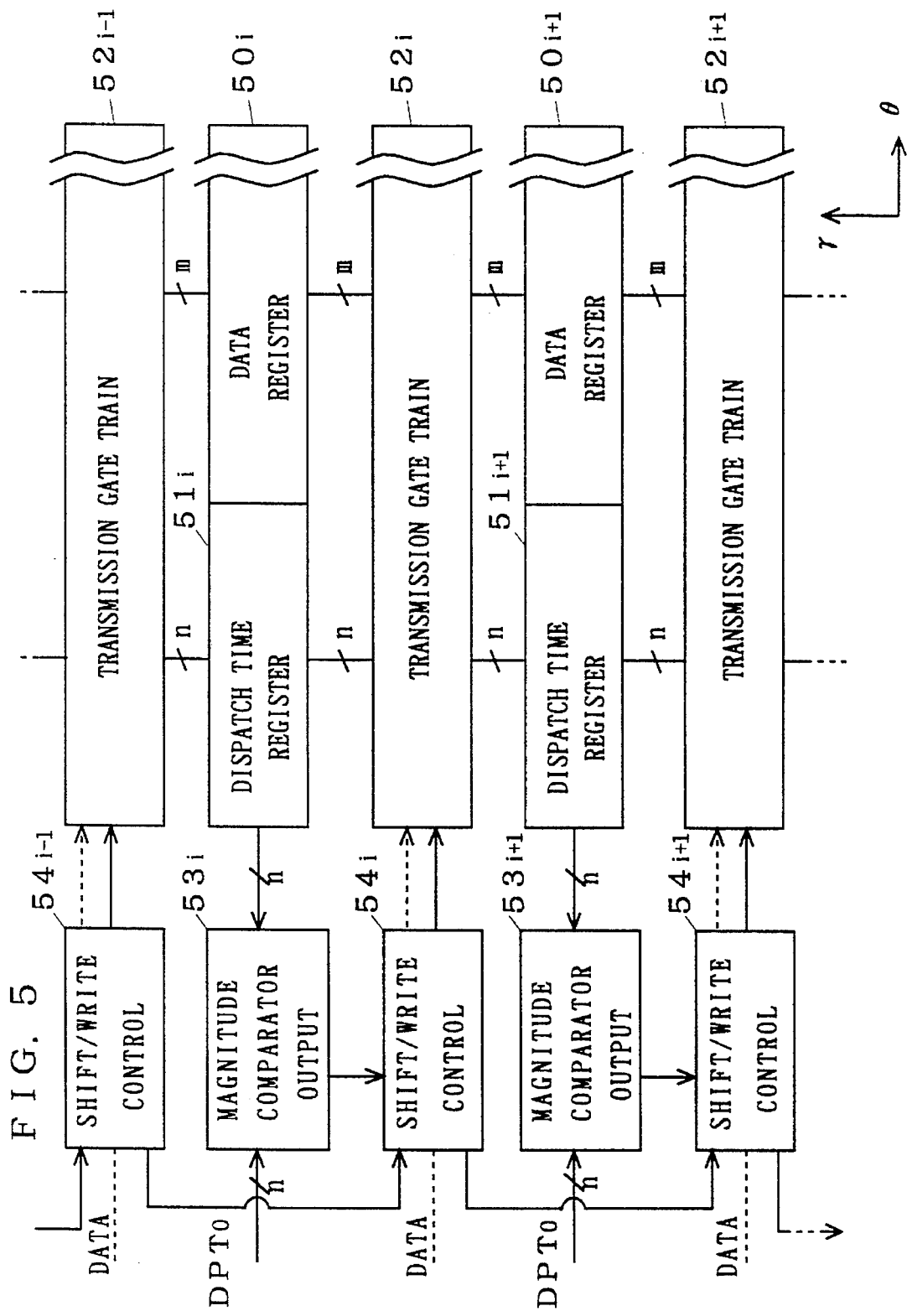
FIG. 5 is a block diagram showing the structure of a shift register employed in the ATM switching unit according to the first embodiment of the present invention.
Figure 27:
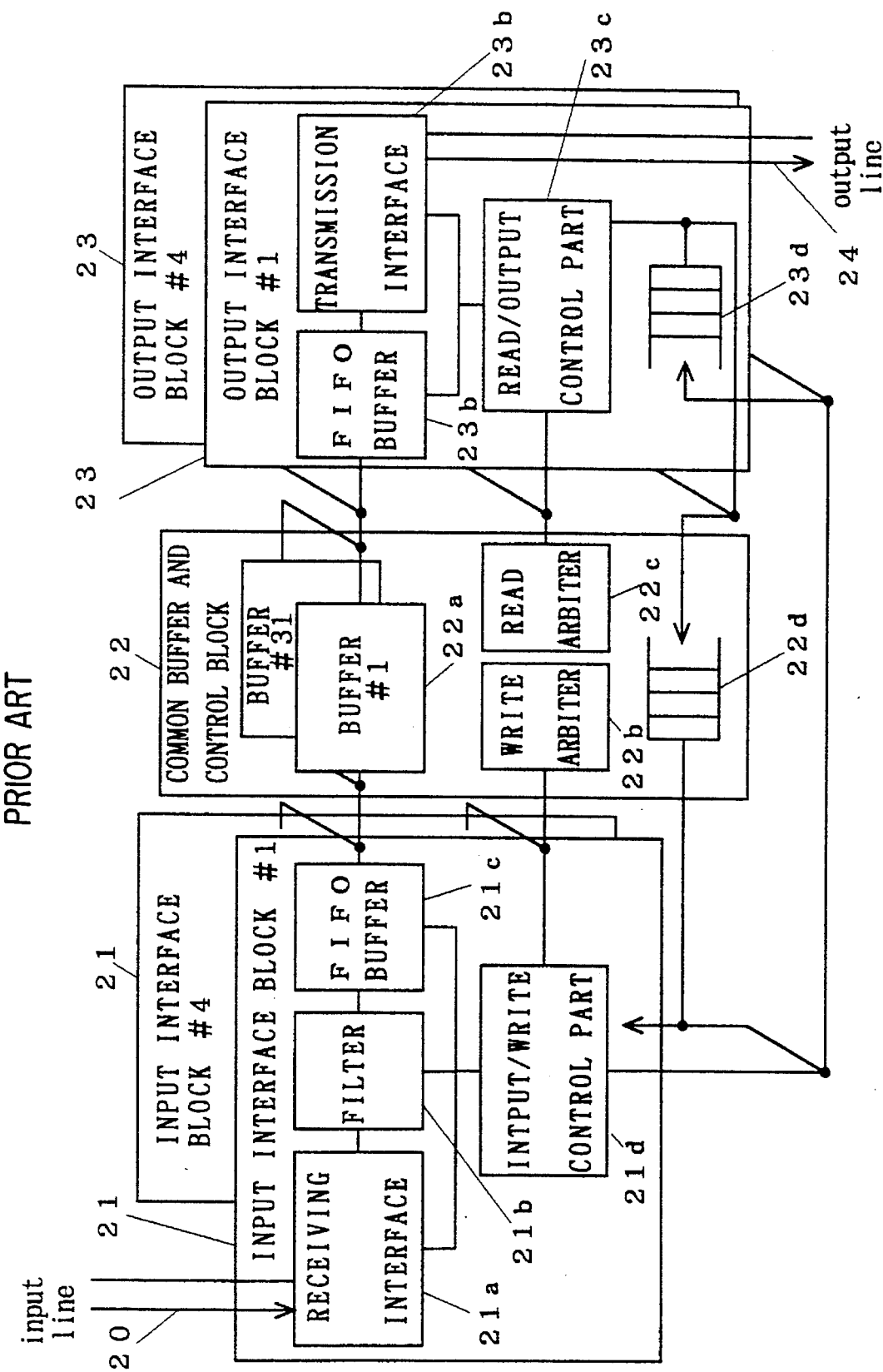
FIG. 27 is a block diagram for illustrating the structure of a conventional ATM switching element.
Figure 30:
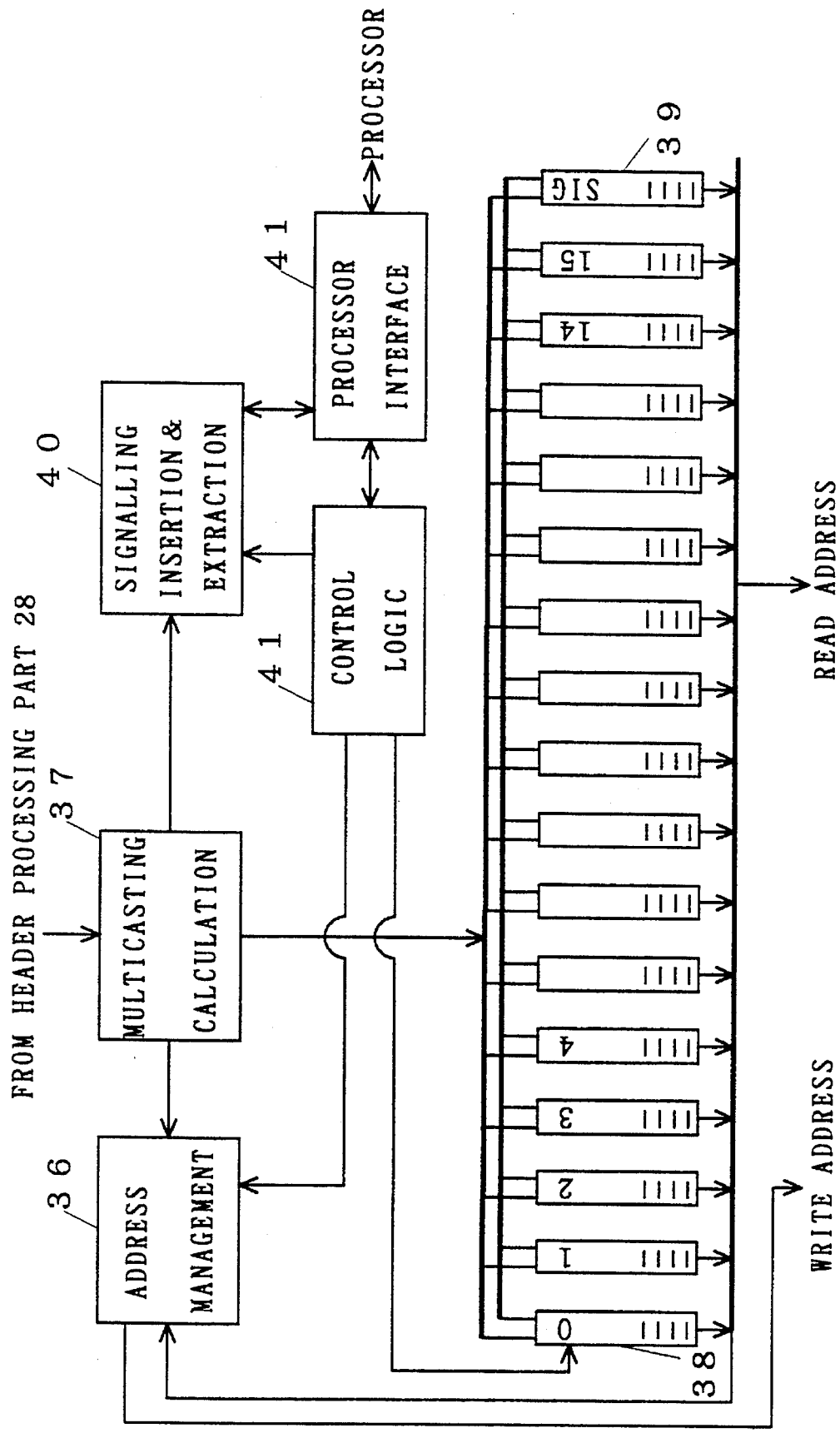
FIG. 30 is a block diagram for illustrating the structure of the conventional ATM switching element.
Figure 31:
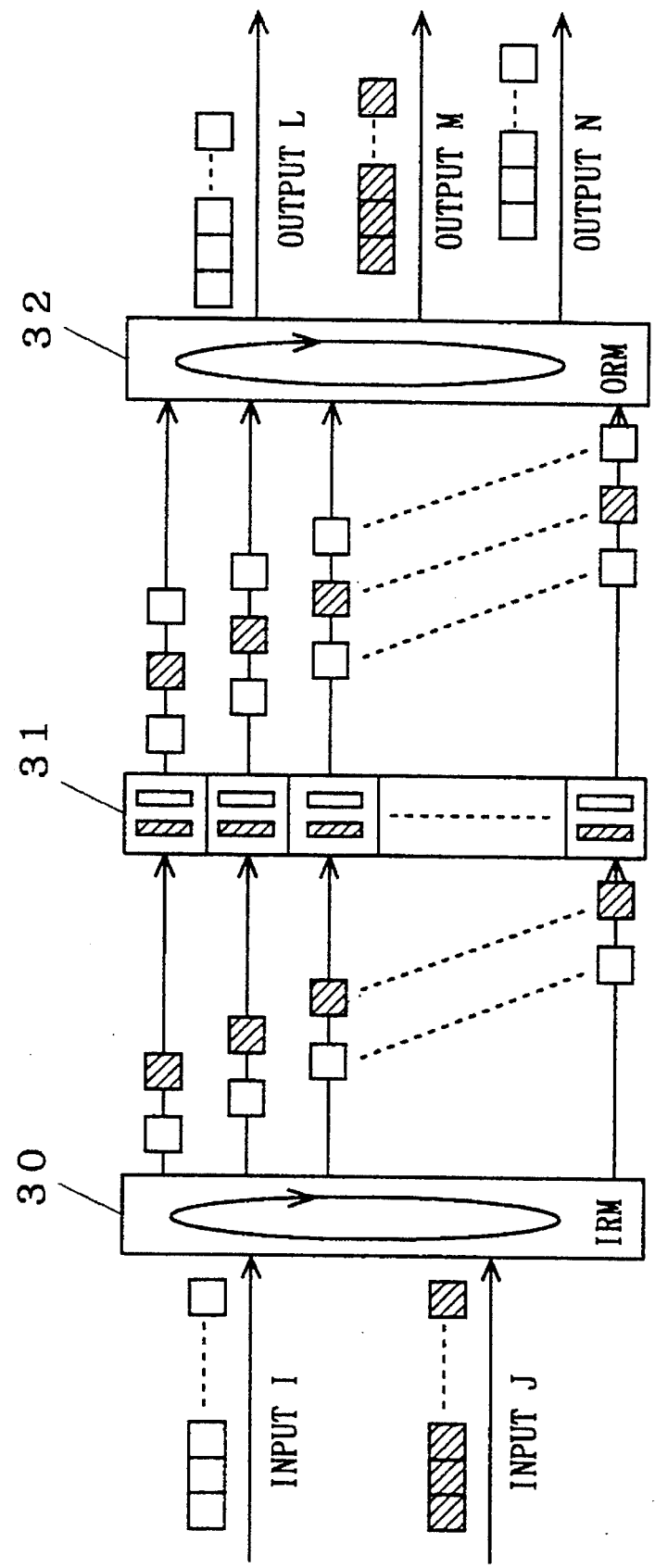
FIG. 31 is a block diagram for illustrating the operation of the conventional ATM switching element.

FIG. 5 is a block diagram showing the structure of each shift register having a priority processing function according to the first embodiment of the present invention. The shift register shown in FIG. 5, corresponding to one of the shift registers 64a to 64p shown in FIG. 1, is a buffer control memory which is employed in place of the output queue 23d shown in FIG. 27 or the queue 38 shown in FIG. 30. Namely, the shift registers of the present invention are employed as memories for deciding the output order of cell data which are outputted from the ATM switching element in an ATM switching unit of a shared memory system. A γ direction of the coordinates shown in FIG. 5 indicates a shift direction in a forward shift operation.

Referring to FIG. 5, numeral 50 denotes a plurality of data registers which are provided with m-bit storage regions arranged in parallel with a θ direction for storing m-bit data such as addresses or cell data and arranged in parallel with each other for transmitting data between different stages, numeral 51 denotes n-bit dispatch time registers which are connected in series with corresponding ones of the data registers 50 for storing the dispatch times, numeral 52 denotes transmission gate trains which are inserted between register stages consisting of the data registers 50 and the dispatch time registers 51 for transferring (n+m)-bit data between the register stages, numeral 53 denotes magnitude comparators for comparing contents of the dispatch time registers 51 with a dispatch time $DPT_0$ of a newly inputted cell, and numeral 54 denotes shift/write controls for controlling rearward data transfer and data write operations performed by the transmission gate trains 52 on the basis of comparison results of the magnitude comparators 53.

A single data register 50, a single dispatch time register 51, a single magnitude comparator 53 and a single shift/write control 54 form a single register stage. The subscripts appearing in FIG. 5 show numbers of the register stages.

The operation of the shift register having a priority processing function shown in FIG. 5 is now described. When new cell data is inputted in the ATM switching element 60 shown in FIG. 1, this shift register receives the dispatch time $DPT_0$ which is analyzed by the extra header analyzer part 62a, with the address of the buffer 61a writing the cell data.

The dispatch time $DPT_0$ of the ATM cell which is newly received by the ATM switching unit 55 and stored in the buffer 61a is inputted in the magnitude comparators $53_i$, $53_{i+1}$ of the respective register stages etc. For example, the magnitude comparator $53_i$ compares the content of the dispatch time register $51_i$ of the corresponding register stage with the dispatch time $DPT_0$.

It is assumed here that the magnitude comparator $53_i$ outputs "1" when the dispatch time $DPT_0$ is smaller than the content of the dispatch time register $51_i$, and outputs "0" in other case. Table 2 shows exemplary comparison results of the magnitude comparators $53_i$, $53_{i+1}$. It is assumed that the results are arranged in order of the dispatch times in the shift register.

TABLE 2

| Register Stage Number | Output of Dispatch Time Register | Output of Magnitude Comparator | Write Output W | Shift Control Output RVS |
|---|---|---|---|---|
| 1 | 7 | 0 | 0 | 0 |
| 2 | 8 | 0 | 0 | 0 |
| 3 | 9 | 0 | 0 | 0 |
| 4 | 10 | 0 | 0 | 0 |
| 5 | 12 | 1 | 1 | 1 |
| 6 | 13 | 1 | 0 | 1 |
| 7 | 14 | 1 | 0 | 1 |
| 8 | 15 | 1 | 0 | 1 |
| . | . | . | . | . |
| . | . | . | . | . |
| . | . | . | . | . |
| . | . | . | . | . |
| . | . | . | . | . |

In relation to the examples shown in Table 2, it is assumed that the value of the dispatch time $DPT_0$ of the newly inputted ATM cell is "11".

The shift/write control $54_i$ receives outputs of the two magnitude comparators $53_i$ and $53_{i-1}$ corresponding to continuous register stages. It supplies a shift control output RVS and a write output W successively to the transmission gate train $52_i$, the data register $50_i$ and the dispatch time register $51_i$. The shift control output RVS which is supplied by the shift/write control $54_i$ to the transmission gate train $52_i$ is identical to an output received by the shift/write control $54_i$ from the magnitude comparator $53_i$ provided in the same register stage.

Among the plurality of register stages, the data registers 50, the dispatch time registers 51 and the transmission gate trains 52 of those receiving "1" as the shift control outputs RVS carry out backward shifting. On the other hand, the remaining register stages receiving "0" as the shift control outputs RVS carry out no backward shifting.

After the backward shifting, therefore, vacancy is caused between the register stages storing dispatch times larger than the dispatch time $DPT_0$ of the newly inputted ATM cell and those storing dispatch times less than the dispatch time $DPT_0$. In the examples shown in Table 2, for example, the register stage number "5" is vacated.

In the shift/write control $54_i$, for example, the write output W is obtained by EXORing outputs of the magnitude comparators $53_{i-1}$ and $53_i$ of the precedent and current stages.

After the shift operations are completed, data are written in the register stages having the write outputs W of "1" through paths shown by dotted lines in FIG. 5. While the shift register shown in FIG. 5 writes data through the transmission gate trains 52 for transferring data between the register stages, other write transmission gate trains may be prepared in correspondence to the data paths.

In the shift register shown in FIG. 5, all cell data having dispatch times which are larger than the dispatch time $DPT_0$ of the newly inputted cell carry out backward shifting among the cell data as stored, so that the newly inputted cell data is inserted in a register stage which is vacated by the backward shifting. Thus, the cell data in this shift register can be sequenced in order of the dispatch times.

The data stored in the shift register can be sequenced in order of the dispatch times in correspondence to the order of the register stages. The cells outgo from the ATM switching element 60 by the addresses which are outputted along the order of the register stages from the shift register, whereby it is possible to perform deadline scheduling. Thus, it is possible to make the conventional ATM switching unit carry out deadline scheduling without remarkably changing the structure.

Figure 6:
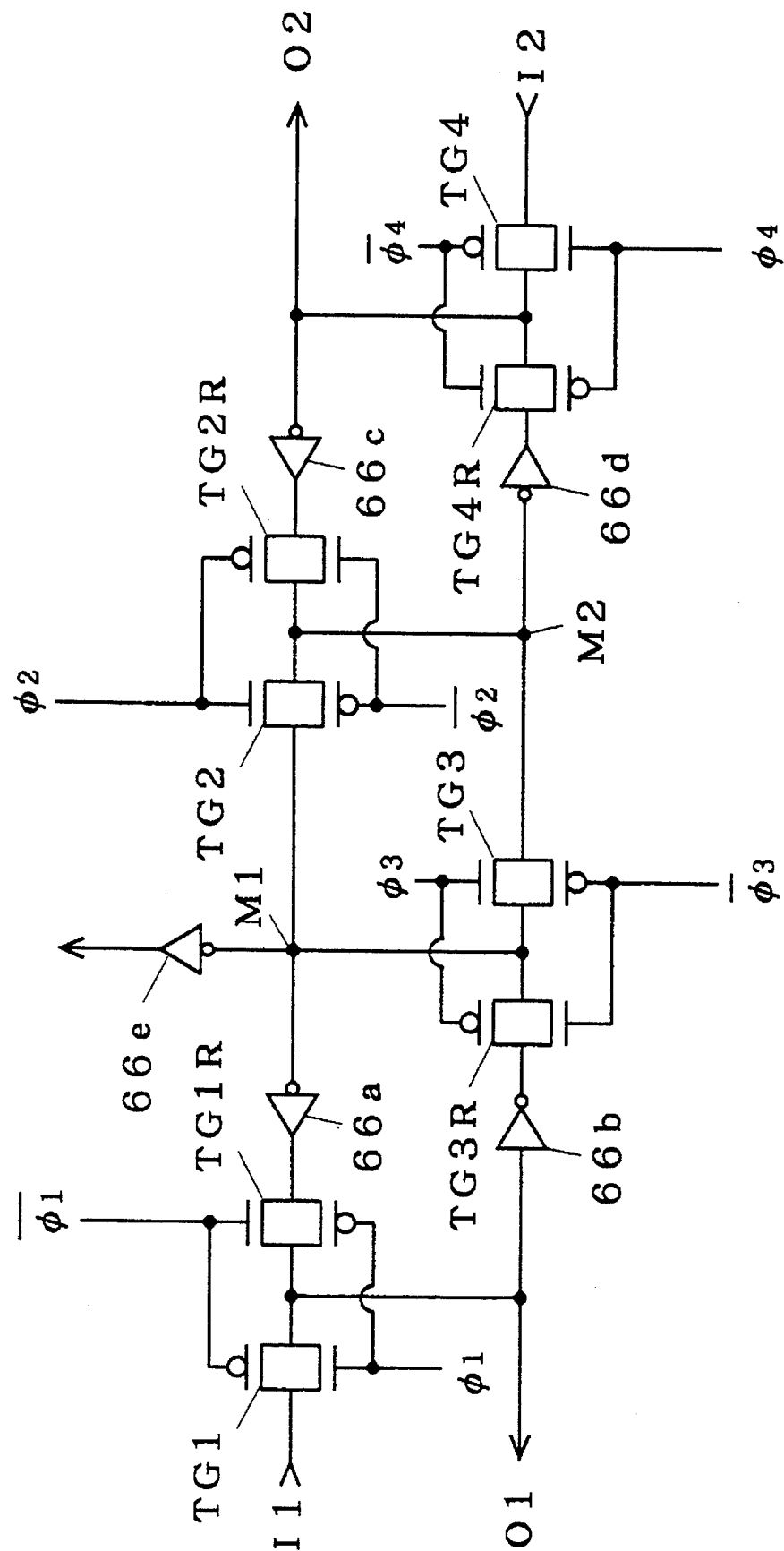
FIG. 6 is a circuit diagram for illustrating the structure of a register forming the shift register shown in FIG. 5.
Figure 7:
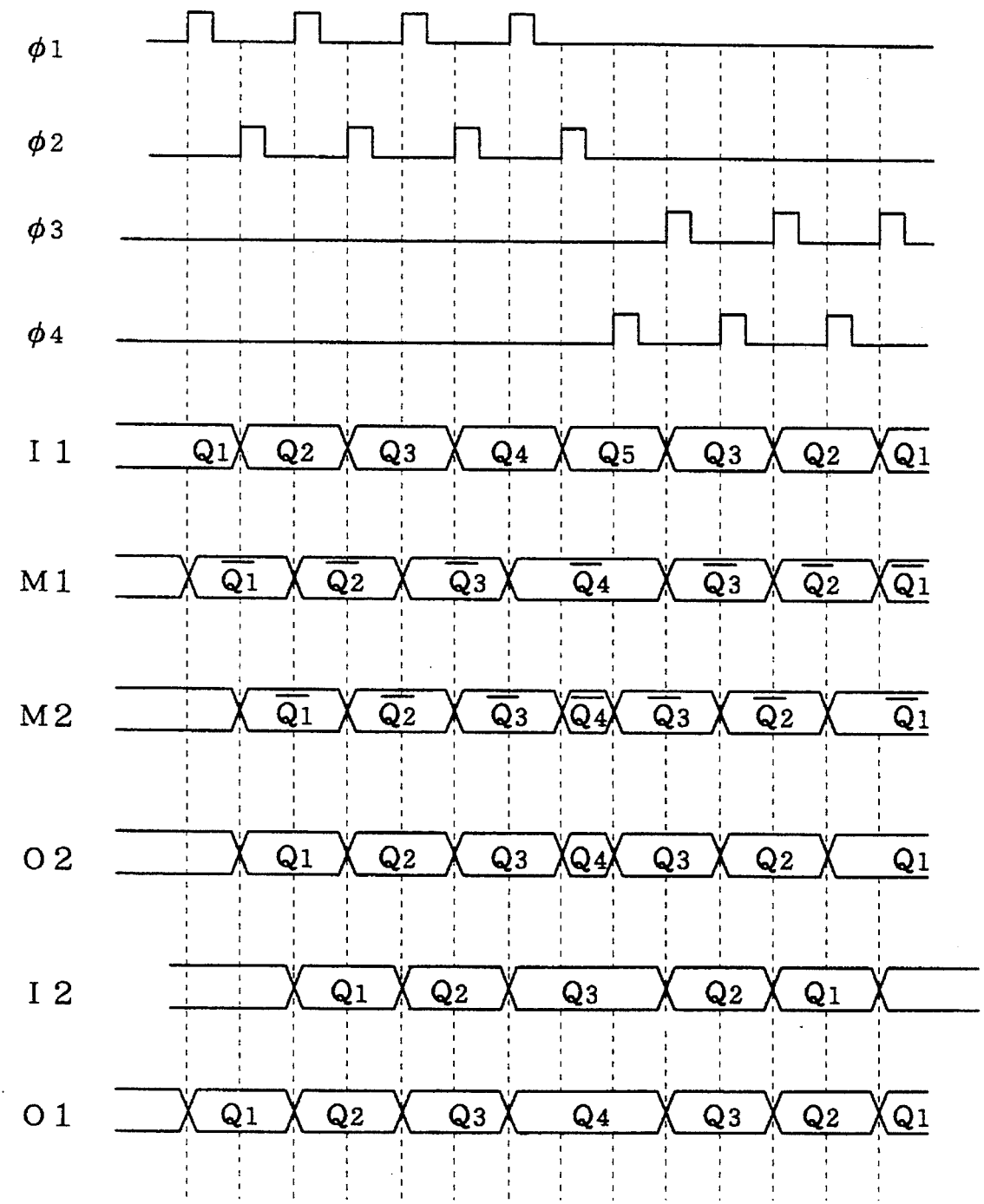
FIG. 7 is a timing chart for illustrating the operation of the register shown in FIG. 6.

A bidirectional register which is employed for the shift register having a priority processing function shown in FIG. 5 is now described with reference to FIGS. 6 and 7. FIG. 6 is a circuit diagram showing the structure of the bidirectional register shifting in two directions, and FIG. 7 is a timing chart related to the bidirectional register shown in FIG. 6. Referring to FIG. 6, numerals 66a, 66b, 66c and 66d denote inverters forming latching circuits, symbols TG1R and TG3R denote transmission gates which are connected to outputs of the inverters 66a and 66b respectively for operating at clocks φ1, φ1 and clocks φ3, φ3, symbols TG2R and TG4R denote transmission gates which are connected to outputs of the inverters 66c and 66d respectively for operating at the clocks φ2, φ2 and the clocks φ4, φ4, symbol TG1 denotes a transmission gate which is provided between an input I1 and an output of the inverter 66a, symbol TG4 denotes a transmission gate which is provided between an input I2 and an output of the inverter 66d, symbols TG2 and TG3 denote transmission gates for shifting the shift register which is formed by the latching circuit consisting of the inverters 66a and 66b and that consisting of the inverters 66c and 66d in any one direction, and numeral 66e denotes an inverter for outputting data held by the latching circuit consisting of the inverters 66a and 66b to a magnitude comparator.

As shown in the timing chart of FIG. 7, the transmission gates TG3R and TG4R enter conducting states and the transmission gates TG3 and TG4 enter nonconducting states when the clocks φ3 and φ4 are set at low levels, whereby the shift register carries out a shift operation of transmitting data received through the input I1 from an output O2. Each magnitude comparator 53 shown in FIG. 5 compares data at a node M1 at a low-level timing of the clock φ1. When the clocks φ1 and φ2 are set at low levels, on the other hand, the transmission gates TG1R and TG2R enter conducting stages and the transmission gates TG1 and TG2 enter nonconducting states, whereby the shift register carries out a shift operation for transmitting data received through the input I2 from an output O1. Each magnitude comparator 53 compares the data at the node M1 at a low-level timing of the clock $\phi 3$.

Figure 8:
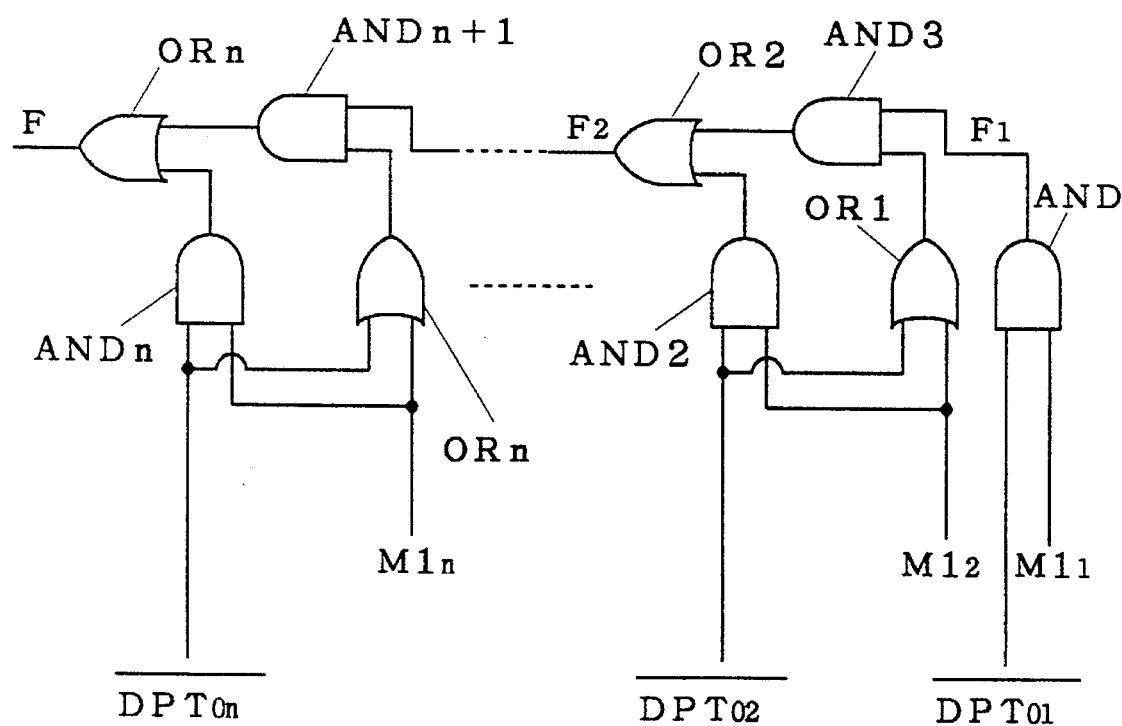
FIG. 8 is a circuit diagram for illustrating the structure of a magnitude comparator forming the shift register shown in FIG. 5.

Each magnitude comparator of the shift register having a priority processing function shown in FIG. 5 is now described with reference to FIG. 8. FIG. 8 is a logic circuit diagram showing an exemplary structure of the magnitude comparator according to the first embodiment of the present invention. This circuit is described in "Gendai Denshi Keisanki" by Ogiwara and Kurozumi, Ohmsha, LTD., published Jan. 25, 1982, version 1, pp. 137 to 138.

It is assumed that M11 to M1n represent data of respective bits which are stored in the dispatch time register and $DPT_0 1$ to $DPT_0 n$ represent data of respective bits of the dispatch time $DPT_0$ of the inputted cell. Referring to FIG. 8, the data M11 and $DPT_0 1$ are supplied to two inputs of an AND gate AND1 respectively, to obtain an output F1. The data M12 and $DPT_0 2$ are supplied to two inputs of an OR gate OR1 respectively while the data M12 and $DPT_0 2$ are supplied to two inputs of an AND gate AND2 respectively. An output of the OR gate OR1 and the output F1 of the AND gate AND1 are supplied to two inputs of an AND gate AND3 respectively, while outputs of the AND gates AND2 and AND3 are supplied to two inputs of an OR gate OR2 to obtain an output F2 of this OR gate OR2. Similarly, the data M1n and $DPT_0 n$ are supplied to two inputs of an OR gate ORn−1 respectively, as well as to two inputs of an AND gate ANDn respectively. An output of the OR gate ORn−1 and an output Fn−1 of an AND gate ANDn−1 are supplied to two inputs of an AND gate ANDn+1 respectively, while outputs of the AND gates ANDn and ANDn+1 are supplied to two inputs of the OR gate ORn respectively, to obtain an output F of the OR gate OR2.

The magnitude comparator compares a dispatch time M1 stored in the dispatch time register with the dispatch time $DPT_0$, to supply "0" to the shift/write control as the output F when $DPT_0 \leq M1$, while supplying "1" to the shift/write control as the output F when $DPT_0 \geq M1$.

Figure 9:
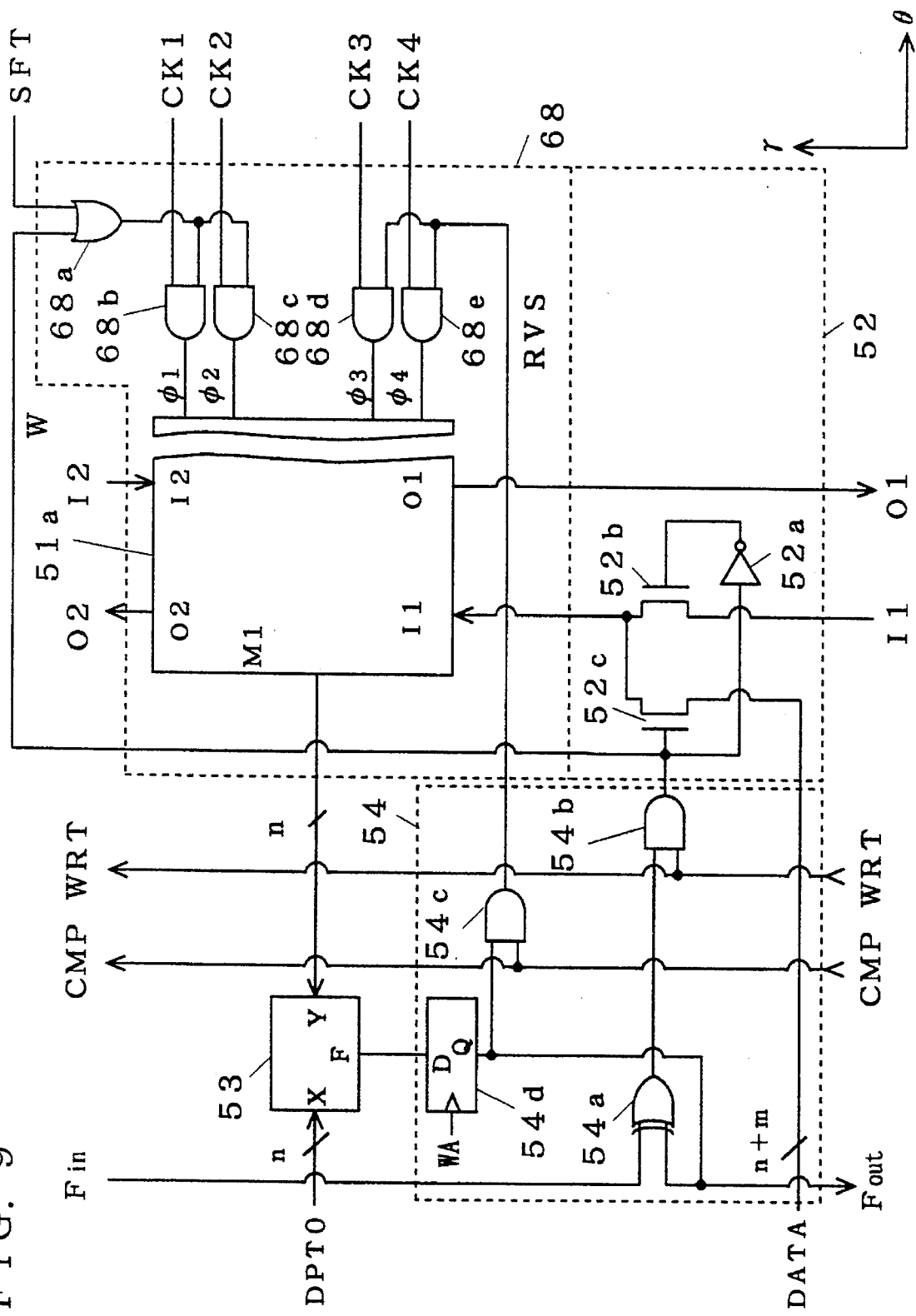
FIG. 9 is a circuit diagram for illustrating the structure of the shift register shown in FIG. 5.

FIG. 9 shows connection for implementing the shift register having a priority processing function shown in FIG. 5 by the bidirectional register and the magnitude comparator shown in FIGS. 6 and 8. In order to simplify the illustration, FIG. 9 shows the bidirectional register only by 1 bit 51a. Referring to FIG. 9, numeral 53 denotes a magnitude comparator which supplies "1" as the output F when a value received from an input X shown in FIG. 8 is smaller than data received from an input Y, numeral 54 denotes a shift/write control, numeral 68 denotes a register stage consisting of an n-bit dispatch time register and an m-bit data register formed by the bidirectional register shown in FIG. 6, and numeral 52 denotes a transmission gate train.

In the shift/write control 54, numeral 54a denotes a two-input exclusive OR gate receiving an output Fin of a precedent stage magnitude comparator in one input for generating a write output W while receiving an output F of a magnitude comparator of a stage corresponding to this register stage in another input, numeral 54b denotes a two-input AND gate receiving an output of the exclusive OR gate 54a in its one input while receiving a signal WRT for controlling writing of inputted cell data etc. in another input for outputting the write output W of the shift/write control 54, numeral 54c denotes a two-input AND gate receiving the output F of the magnitude comparator of a stage corresponding to this register stage in one input while receiving a signal CMP for controlling backward shifting in another input for outputting a shift control output RVS, and numeral 54d denotes a D-latch for holding the output F of the magnitude comparator 53 and supplying the same to the exclusive OR gate 54a and the AND gate 54c upon input of new data.

In the register stage 68, numeral 68a denotes a two-input OR gate receiving the write output W of the shift/write control 54 in one input while receiving a signal SFT for controlling an ordinary shift operation of the shift register in another input, numeral 68b denotes a two-input AND gate receiving an output of the OR gate 68a in one input while receiving a clock CK1 in another input for outputting a clock $\phi 1$ to the register in the same register stage, numeral 68c denotes a two-input AND gate receiving the output of the OR gate 68a in one input while receiving a clock CK2 in another input for outputting a clock $\phi 2$ to the register in the same register stage, numeral 68d denotes a two-input AND gate receiving the shift control output RVS of the AND gate 54c in one input while receiving a clock CK3 in another input for outputting a clock $\phi 3$ to the register in the same register stage, and numeral 68e denotes a two-input AND gate receiving the shift control output RVS of the AND gate 54c while receiving a clock CK4 in another input for outputting a clock $\phi 4$ to the register in the same register stage.

In the transmission gate train 52, numeral 52a denotes an inverter receiving the write output W of the shift/write control 54, numeral 52b denotes a gate for passing data when an output of the inverter 52a is at a high level for connecting an output of a subsequent stage shift register to the input I1 of the bidirectional register 51a, and numeral 52c denotes a gate for passing inputted cell data to the input I1 of the bidirectional register 51a when the write output W is at a high level. The gates 52b and 52c are complementarily operating switching means.

Figure 10:
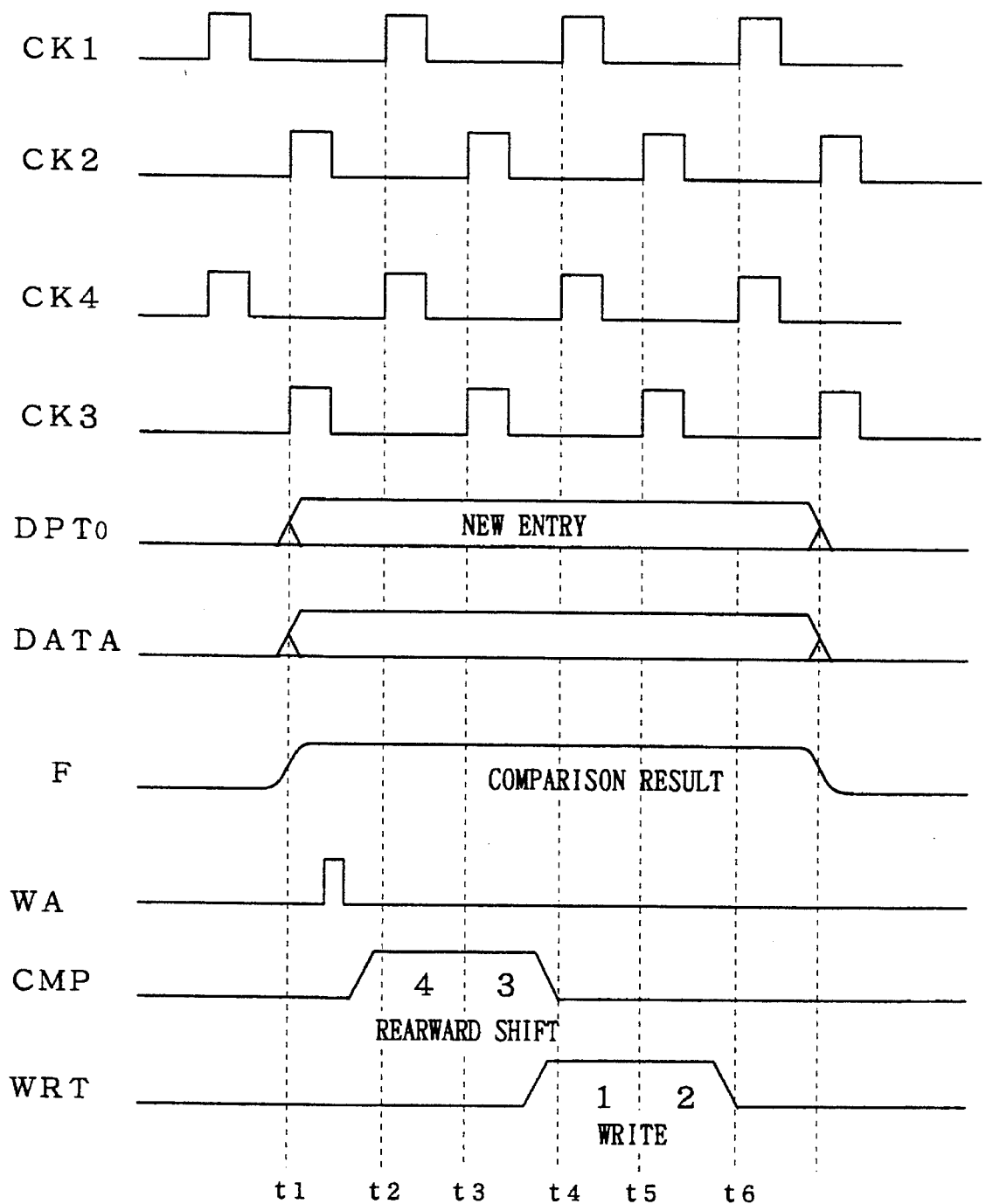
FIG. 10 is a timing chart for illustrating the operation of the shift register shown in FIG. 9.

The operation of the shift register shown in FIG. 9 is now described with reference to FIG. 10.

Newly inputted cell data and the dispatch time $DPT_0$ are supplied to the shift register on the leading edge t1 of the clocks CK2 and CK3, and compared in the magnitude comparator 53 in a period up to the leading edge t2 of the next clocks CK1 and CK4. The magnitude comparator 53 outputs "0" when the input Y is less than the input X, while outputting "1" when the input X is greater than the input X. Referring to FIG. 10, the magnitude comparator 53 outputs "1" as the output F. After input of data DATA, a signal WA is inputted in the D-latch 54d for holding the output F.

The control signal CMP for making backward shifting is at a high level on the leading edge t2 of the clocks CK1 and CK4. The signal CMP controls backward shifting for going high for one cycle in general in synchronization with the clocks CK1 to CK4. Since the signal CMP and the output F of the magnitude comparator 53 are at high levels, the output RVS of the AND gate 54c of the shift/write control 54 goes high. Thus, the AND gate 68d outputs the clock CK3 to the bidirectional register as the clock $\phi 3$. Further, the AND gate 68e outputs the clock CK4 to the bidirectional register as the clock $\phi 4$.

On the other hand, the signal WRT for controlling writing is at a low level at the time t2, whereby the AND gate 54b outputs a low level as the write output W. When the new cell data is written, the signal SFT for controlling the ordinary shift operation is at a low level, whereby the OR gate 68a outputs a low level. Thus, both outputs of the OR gates 68b and 68c are at low levels.

Since both of the clocks φ1 and φ2 are at low levels, the bidirectional register 51a receives the input I2 from that of the precedent stage to store the same, and supplies data having been stored therein to the bidirectional register of the subsequent stage from the output O2. Namely, the bidirectional register of the register stage receiving high levels as the outputs F and W from the magnitude comparator 53 and the shift/write control 54 causes such backward shifting that the clock φ3 rises at a time t3 for transmitting data of the precedent stage to the subsequent stage. In the shift register, every register stage having the output F of the magnitude comparator 53 at a high level carries out such backward shifting.

Thus, a proper register stage of the shift register has a vacant position, and the signal WRT for controlling writing of new cell data is brought into a high level by one cycle after the signal CMP is converted from a high level to a low level.

At a time t4, the signal CMP for controlling the backward shifting goes low and the signal WRT for controlling writing goes high. Since the signal CMP goes low, the output RVS of the AND gate 54c goes low, whereby the clocks φ3 and φ4 go low. Further, the signal WRT is at a high level and the clocks φ1 and φ2 become the clocks CK1 and CK2, whereby an ordinary shift operation is caused in the shift register.

However, the signal WRT for controlling writing goes high, whereby the gate 52b cuts off the input I1 while the gate 52c passes the cell data DATA to the bidirectional register 51a.

At a time t5, the clock φ1 is at a low level and the clock φ2 rises, whereby the bidirectional register 51a latches the data.

At a time t6, the write control signal WRT goes low and writing of the new cell data is completed.

In order to read the content of the register stage at the head (frontmost stage) for carrying out an ordinary operation as a queue operation, the signal SFT is brought into a high level and the shift register carries out a shift operation in the forward direction. Since the signal SFT is brought into a high level, the clocks CK1 and CK2 are supplied to the outputs φ1 and φ2 and data received from the input I1 is transmitted to the output O2 in the γ direction, thereby causing the forward shift operation.

As hereinabove described, one cycle is required for comparing the dispatch time $DPT_0$ of the new cell with the content of each register stage, one cycle is required for backward shifting of the bidirectional register 51a for ensuring a new data writing region and one cycle is required for writing the data of the new cell after the backward shifting, and sorting of sequencing the data in order of DPT is completed in these 3 cycles in total. It is understood possible to carry out the sorting at an extremely high speed for performing deadline scheduling in a simple structure by employing the shift register shown in FIG. 9.

An ATM switching element according to a second embodiment of the present invention is now described. While the first embodiment is adapted to carry out operations in no consideration of the storage capacity of the dispatch time register 51, the dispatch time values may exceed the storage capacity of the register since the bit length of the dispatch time register is finite. This state is shown in Table 3.

TABLE 3

| Dispatch Time | Continuous Expression | Cyclic Expression | Cyclic Expression with Sections (Vacancy included) Section | Cyclic Expression without Sections (Vacancy not included) Section |
| --- | --- | --- | --- | --- |
| 0 | 000 | 000 | 0-000 | 0-000 |
| 1 | 001 | 001 | 0-001 | 0-001 |
| 2 | 010 | 010 | 0-010 | 0-010 |
| 3 | 011 | 011 | 0-011 | 0-011 |
| 4 | 100 | 100 | 0-100 | 0-100 |
| 5 | 101 | 101 | 0-101 | 0-101 |
| 6 | 110 | 110 | 0-110 | 0-110 |
| 7 | (not | 000 | 1-000 | 0-111 |
| 8 | expressible | 001 | 1-001 | 1-000 |
| 9 | from here) | 010 | 1-010 | 1-001 |
| 10 | | 011 | 1-011 | 1-010 |
| 11 | | 100 | 1-100 | 1-011 |
| 12 | | 101 | 1-101 | 1-100 |
| 13 | | 110 | 1-110 | 1-101 |
| 14 | | 000 | 0-000 | 1-110 |
| 15 | | 001 | 0-001 | 1-111 |
| 16 | | 010 | 0-010 | 0-000 |
| 17 | | 011 | 0-011 | 1-001 |
| 18 | | 100 | 0-100 | 1-010 |
| 19 | | 101 | 0-101 | 1-011 |
| 20 | | 110 | 0-110 | 1-100 |

When the bit length of the dispatch time register is 3 bits in continuous expression of the dispatch time, for example, 111* (*: binary expression) can express 000* to 110*, i.e., only dispatch time values of 0 to 6 in decimal expression, for expressing that the data register of the register stage stores no necessary data, i.e., the data register is in a vacant state. Thus, cells having dispatch time values exceeding 7 cannot be handled by the ATM switching element.

When cyclic expression with remainder theorem is employed in order to solve this disadvantage, remainders of division by 7 are stored as dispatch time values in the dispatch time register in the aforementioned situation.

Thus, the dispatch times can be stored in the dispatch time register in an unlimited manner. However, in the case shown in Table 3, for example, it is impossible to distinguish simultaneously inputted cells having dispatch time values of "1", "8" and "15". Also in cyclic expression, the maximum and minimum values $DPT_{max}$ and $DPT_{min}$ of the dispatch times are ultimately decided such that $DPT_{max} - DPT_{min}$ must be less than or equal to 7 in the case of 3 bits, for example.

It is possible to express arbitrary dispatch times which are in the range ($DPT_{max}-DPT_{min} \leq 7$) of those expressible by 3 bits, by providing the dispatch time register in a 4-bit structure and allotting one of the 4 bits to a section bit. Thus, it is possible to express arbitrary dispatch times with a small number of dispatch time registers, thereby miniaturizing the shift register.

If the dispatch time range of 7 is insufficient, the bit number employed for cyclic expression may be increased. About 16 bits are generally employed, for example.

The sectional indication is not restricted to single bits of "0" and "1", but the bit number can be increased at need.

A calculation procedure of cyclic expression provided with sections is now described with reference to a flow chart shown in FIG. 11, on the assumption that cell data arrives at the ATM switching element at a time Tin=6 with a stayable time Td=4 in the ATM switching element to be supplied to the data.

Tin=0–110* and Td=100* are supplied at a step ST11. Tin and Td are added up at a step ST12, to obtain DPT=1010* ($Z_3Z_2Z_1Z_0$). A determination is made at a step ST13 as to whether the fourth digit of DPT is "1" or "0". If $Z_3$ is "1", offset subtraction is carried out (step ST14), and a complement of Pin=0 is employed as a section bit $P_0$ of $DPT_0$ (step ST15). Then, the dispatch time $DPT_0$ {=($P_0-Z_2Z_1Z_0$)} is expressed with the section $P_0$=1 obtained at the step ST15 (step ST17).

A calculation procedure of cyclic expression provided with sections is now described with reference to the flow chart shown in FIG. 11, on the assumption that cell data arrives at the ATM switching element at a time Tin=8 with a stayable time Td=2 in the ATM switching element to be supplied to the data.

Tin=1–0001* and Td=010* are supplied at the step ST11. Tin and Td are added up at the step ST12, to obtain DPT=0011*. A determination is made at the step ST13 as to whether the fourth digit of DPT is "1" or "0". If $Z_3$ is "0", no offset subtraction is carried out but Pin=0 is employed as the section bit $P_0$ of $DPT_0$ as such (step ST16). Then, the dispatch time $DPT_0$ is expressed with the section $P_0$=1 obtained at the step ST15 (step ST17).

Tables 4 and 5 show examples of outputs of dispatch time registers processed by magnitude comparators in employment of cyclic expression provided with section bits.

TABLE 4

| Dispatch Time | Section | Internal Expression | Maximum Section Signal PM | Input to Magnitude Comparator |
|---|---|---|---|---|
| 10 | 1 | 1-100 | 1 | 1100 |
| 7 | 1 | 1-000 | 1 | 1000 |
| 6 | 0 | 0-110 | 1 | 0110 |
| 5 | 0 | 0-101 | 1 | 0101 |

TABLE 5

| Dispatch Time | Section | Internal Expression | Maximum Section Signal PM | Input to Magnitude Comparator |
|---|---|---|---|---|
| 16 | 0 | 0-011 | 0 | 1000 |
| 13 | 0 | 0-000 | 0 | 1000 |
| 12 | 1 | 1-110 | 0 | 0110 |
| 10 | 1 | 1-100 | 0 | 0100 |

Figure 12:
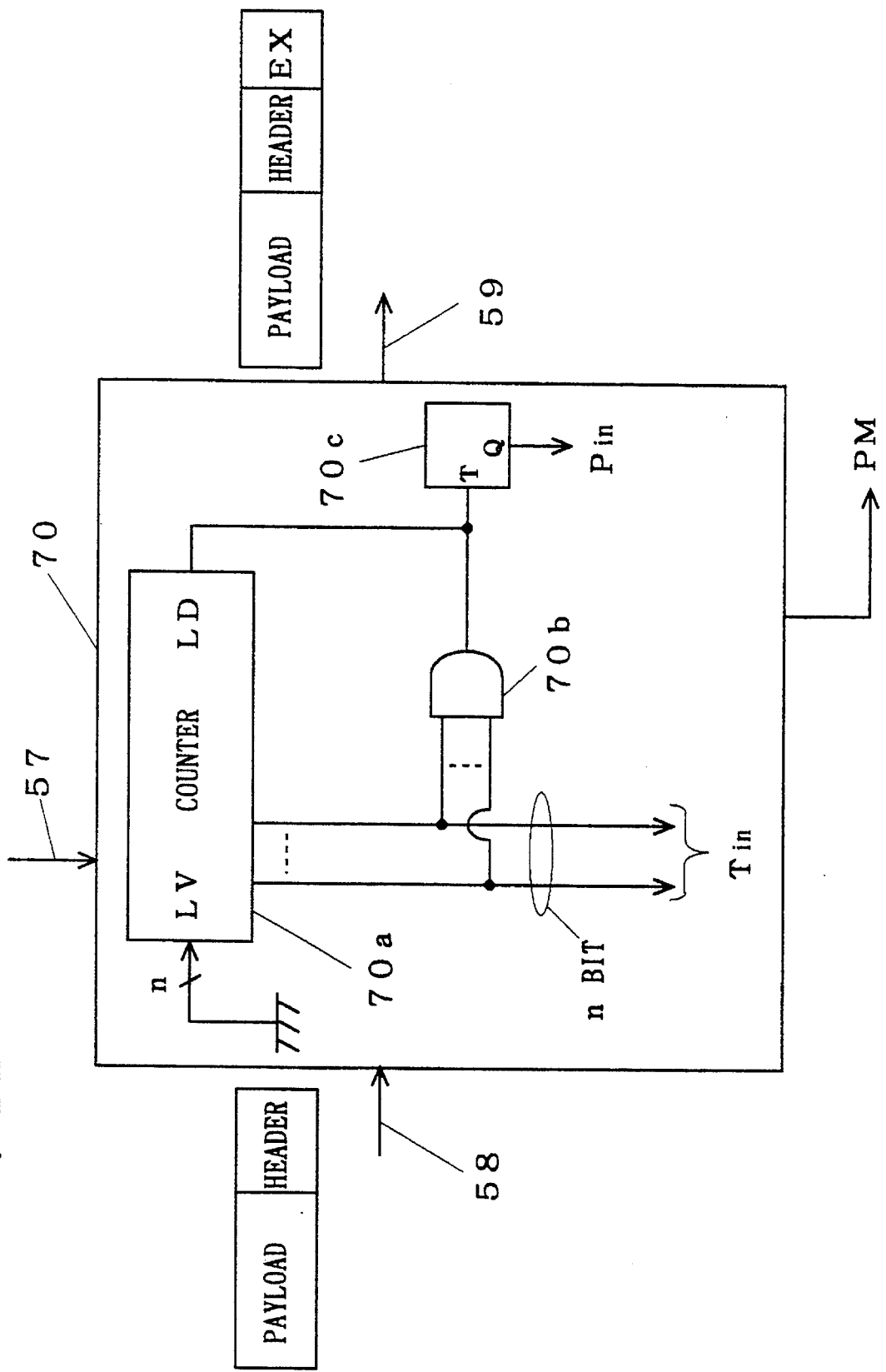
FIG. 12 is a block diagram for illustrating the structure of an extra header adding part according to a second embodiment of the present invention.

Description is now made on the structure of an ATM switching element having a function of cyclically calculating dispatch times. FIG. 12 is a block diagram for illustrating the structure of an extra header adding part. Referring to FIG. 12, numeral 70 denotes the extra header adding part, numeral 70a denotes a counter for supplying a time Tin of arrival of an ATM cell 58, numeral 70b denotes an AND gate for ANDing all bit data indicating Tin outputted by the counter 70a and supplying its output to an input LD of the counter 70a, and numeral 70c denotes a toggle flip-flop for receiving the output of the AND gate 70b and outputting Pin.

It is assumed that Tin is expressed in n bits (n=3 in the above example). LD (load) is immediately applied to the counter 70a when it reaches 111 . . . 1* and an LV value=00 . . . .0* is loaded, and hence the value immediately reaches 000 . . . 0* with instantaneous appearance of 111 . . . 1*. The toggle flip-flop 70c is toggled with the instantaneous 111 . . . 1* to obtain Pin. When such design is made that Tin is incorporated at the instantaneous 111 . . . 1* with a proper clock, it is possible to design the extra header adding part not to load this.

Figure 13:
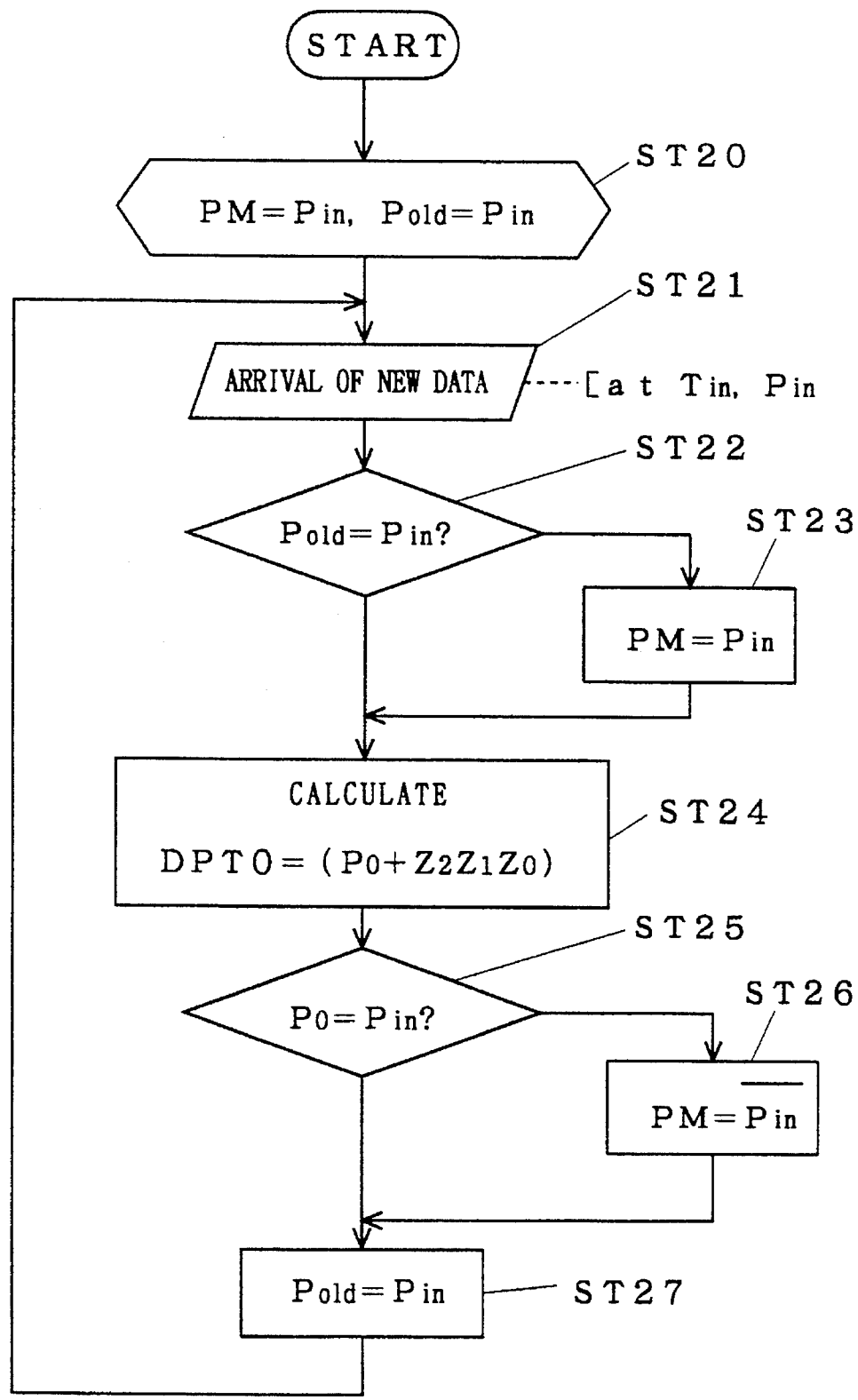
FIG. 13 is a flow chart for illustrating the operation of the extra header adding part shown in FIG. 12.

Formation of a maximum section signal PM is now described with reference to a flow chart shown in FIG. 13. First, prepared is such a state that the section value Pin at the time Tin is substituted in the maximum section signal PM while the section value Pin is also substituted in a section value Pold (step ST20).

Then, new data arrives at a time Tin at a step ST21. The section value Pin at the time Tin is also supplied as an output of the toggle flip-flop 70c.

Then, a determination is made at a step ST22 as to whether or not the section value Pin at the time Tin of arrival of the new cell is changed by comparing the same with the section value Pold. If the determination is of no, the process directly advances to a step ST24, while the maximum section signal PM is changed to the section value Pin upon arrival of the new cell at a step ST23 if the determination is of yes, so that the process thereafter advances to the step ST24.

Figure 11:
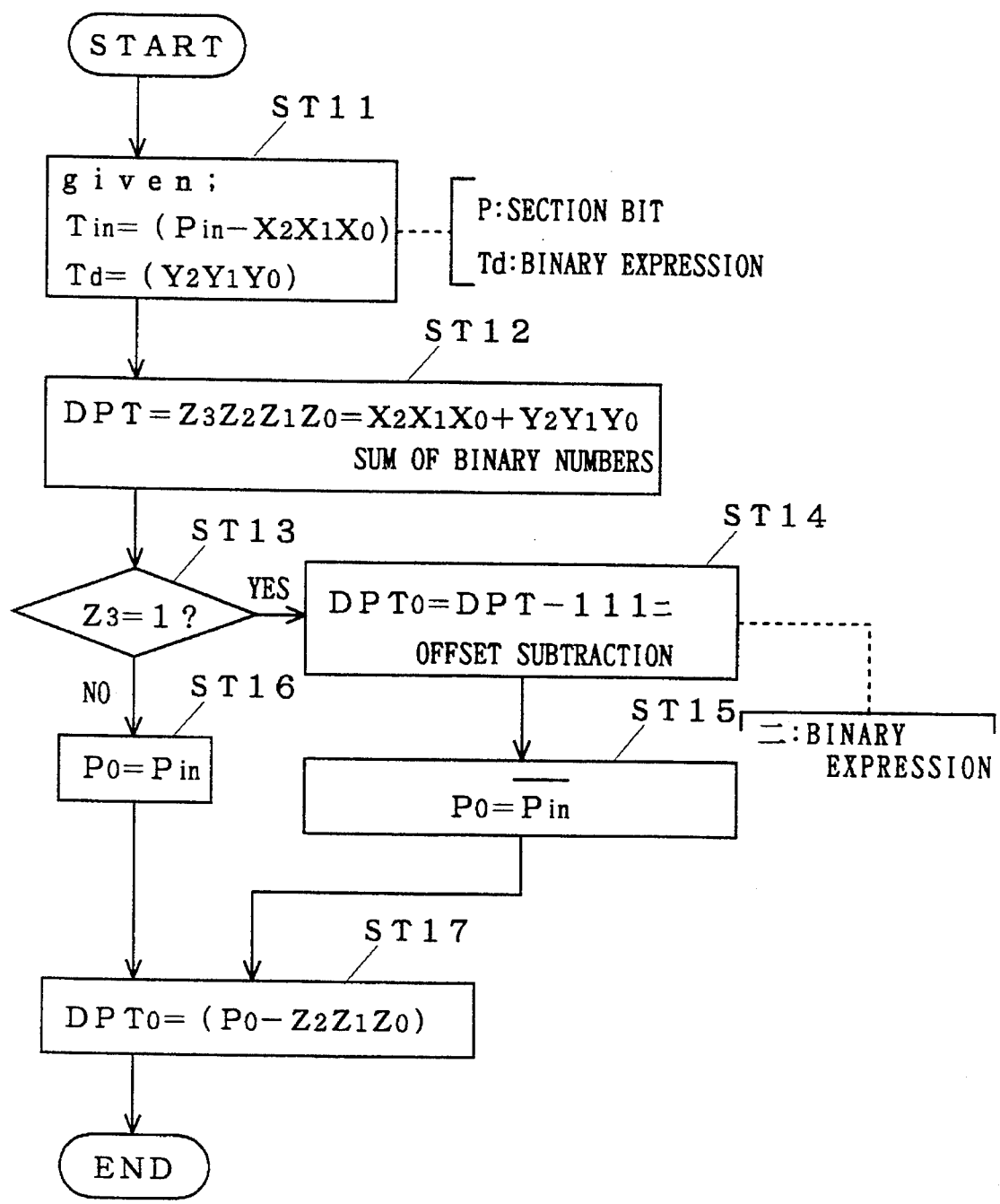
FIG. 11 is a flow chart for illustrating the operation of the extra head adding part shown in FIG. 1.

At the step ST24, the dispatch time $DPT_0$ of the new cell is calculated through the series of procedure shown in FIG. 11.

A determination is made at a step ST25 as to whether or not the section value $P_0$ of the new cell is identical to the section value Pin of the arrival time. If the determination is of no, a complement of the section value Pin is substituted in the maximum section signal PM at a step ST26, and the process advances to a step ST27. If the determination is of yes, on the other hand, the process directly advances to the step ST27.

At the step ST27, the section value Pold is changed to the section value Pin at the time Tin of arrival of the new cell. After completion of the step ST27, the process returns to the step ST21, to process a newly arriving cell.

Figure 14:
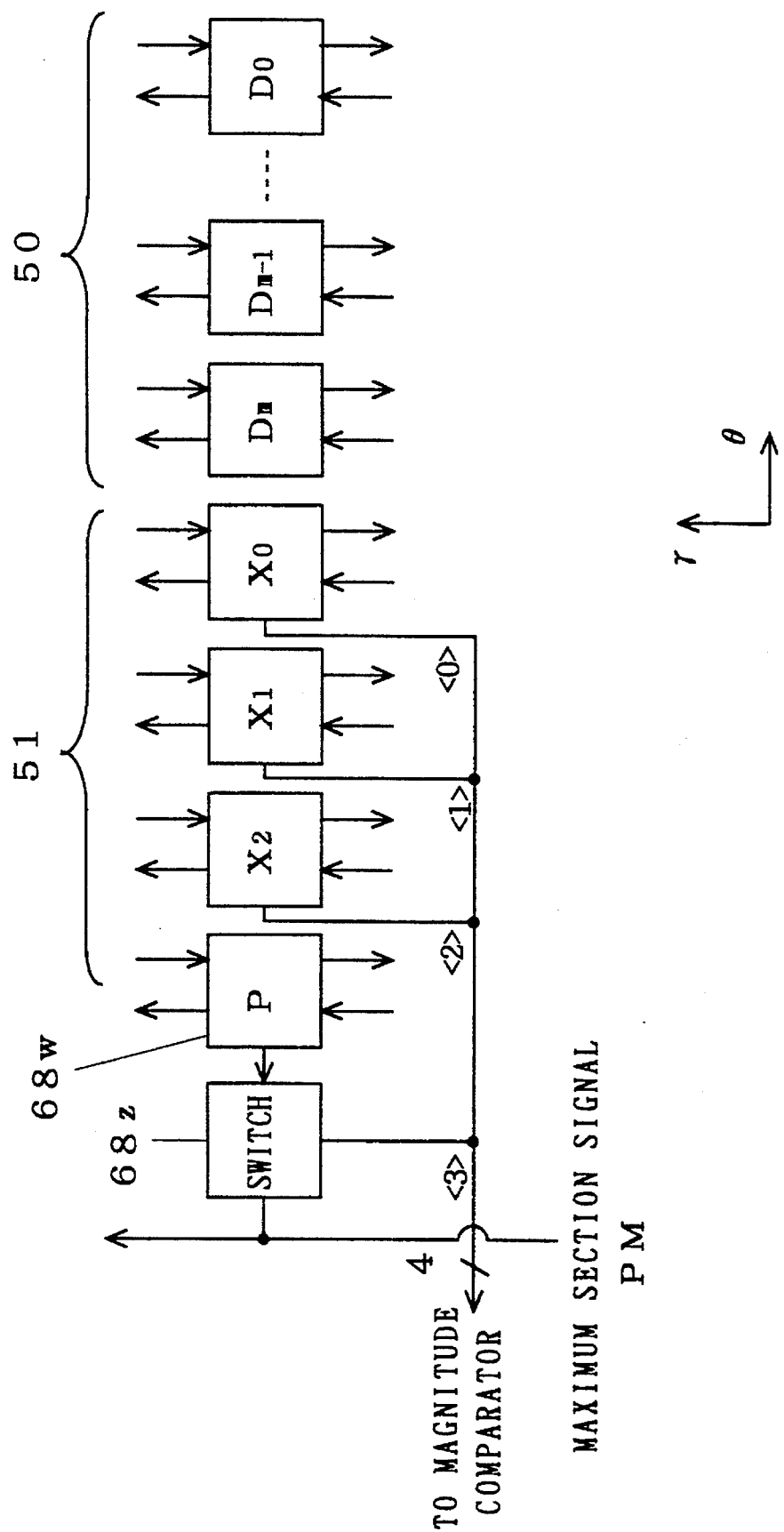
FIG. 14 is a block diagram for illustrating the structures of register stages forming the shift register shown in FIG. 5.

Description is now made on change of the shift register for executing priority processing through the cyclic expression with reference to FIG. 14. Referring to FIG. 14, numeral 68z denotes a switching circuit for changing outputs of dispatch time registers 51 and numeral 68w denotes a section register, while numerals identical to those in FIG. 5 denote portions corresponding to those of FIG. 5. The section register 68w is formed by a bidirectional register, similarly to data registers 50 and the dispatch time registers 51. The section register 68w holds the section value Pin, which is transmitted with the dispatch times $DPT_0$ transmitted to the dispatch time registers 51.

The switching circuit 68z switches the output of the section register 68w by the value of the maximum section signal PM. Outputs of the switching circuit 68z with respect to the content of the section register 68w and the maximum section signal PM must be as shown in Table 6.

TABLE 6

| PM | P | Output |
|----|---|--------|
| 0  | 0 | 1      |
| 0  | 1 | 0      |
| 0  | 0 | 0      |
| 0  | 1 | 1      |

Figure 15:
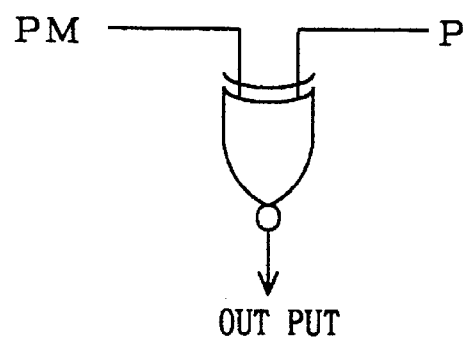
FIG. 15 is a circuit diagram showing a structure of a switching circuit shown in FIG. 14.
Figure 16:
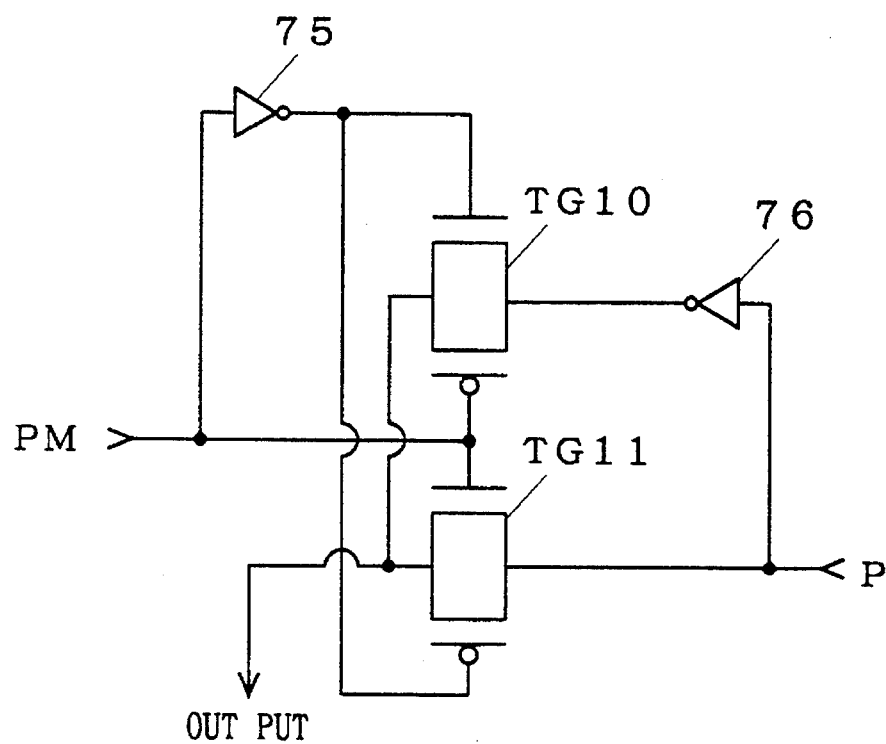
FIG. 16 is a circuit diagram showing the other structure of the switching circuit shown in FIG. 14.

A circuit for implementing such switching can be implemented by a two-input exclusive NOR (EXNOR) circuit receiving the content of the section register 68w and the maximum section signal PM respectively, as shown in FIG. 15. The circuit may alternatively be implemented by that shown in FIG. 16. Referring to FIG. 16, numeral 75 denotes an inverter outputting the signal that inverts the maximum section signal PM, numeral 76 denotes an inverter outputting the signal having the value that inverts the section value P stored in the register, symbol TG10 denotes a transmission gate for passing the signal outputted from the inverter 76 when PM is at a low level, and symbol TG11 denotes a transmission gate for passing P when PM is at a high level.

A third embodiment of the present invention is now described. When all dispatch time registers are set at 1 in initialization sequence of a shift register, dispatch times $DPT_0$ of cells thereafter received are necessarily smaller than the maximum value (value expressed by bits entirely set at 1).

A register stage provided with a dispatch time register having 1 in all bits is a vacant stage. Therefore, a magnitude comparator makes comparison for successively inserting data in order of dispatch times from that having the smallest stage number. Thus, it is possible to implement a shift register in which data are automatically sequenced from the frontmost register stage in a simple structure. Further, a time Tin is also zeroed at a time when the overall network is initialized.

In general, buffers of an ATM switching element have a slightly large capacity in order to prepare for rarely occurring congestion. Therefore, a number of vacant stages are present in occurrence of no congestion. Thus, register stages corresponding thereto are also present in a large number, and hence power consumption can be reduced by stopping operations of the vacant stages. When dispatch time registers and data registers are long, clock components for driving the same contribute to reduction of power consumption, whereby a remarkable effect is expected particularly in reduction of power consumption.

Figure 17:
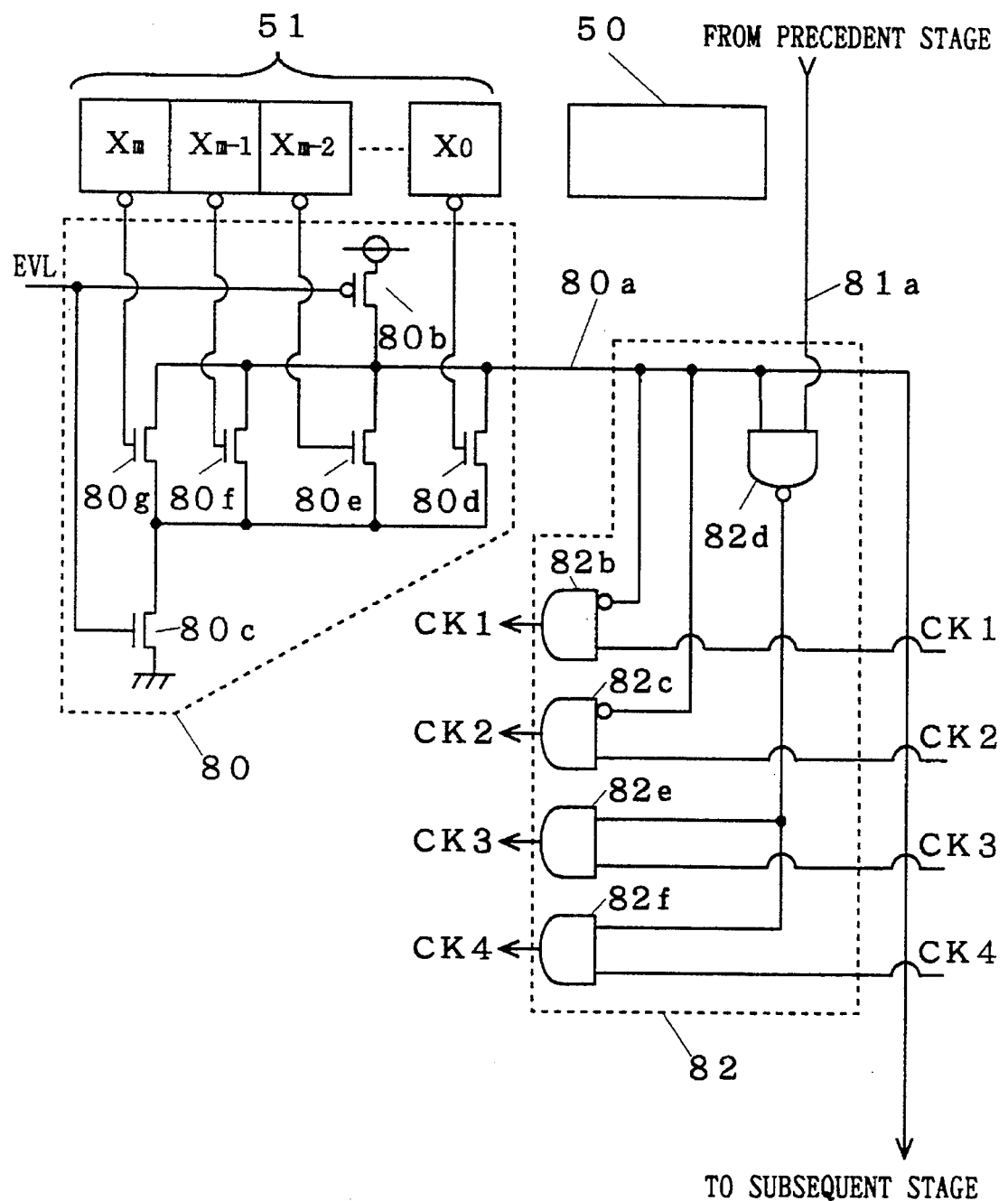
FIG. 17 is a circuit diagram for illustrating the structure of a clock control circuit according to a third embodiment of the present invention.

FIG. 17 illustrates the structure of dispatch time registers according to the third embodiment of the present invention. Numeral 51 denotes the dispatch time registers, numeral 80 denotes a vacant stage decision circuit for outputting the logical product of respective bit data of the dispatch time registers 51, and numeral 82 denotes a clock control circuit for receiving an output 80a of the vacant stage decision circuit 80 and an output 81a of another vacant stage decision circuit which is connected to dispatch time registers of a precedent stage and controlling clocks CK1 to CK4.

Figure 18:
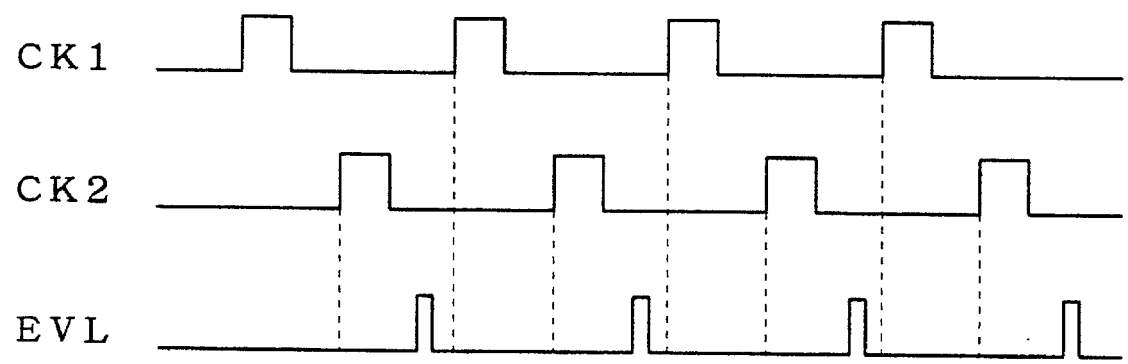
FIG. 18 is a timing chart for illustrating the operation of the circuit shown in FIG. 17.

The vacant stage decision circuit 80 is formed by a NOR gate for receiving inverted outputs of all bits of the dispatch time registers 51 and outputting negation of the logical sum of all outputs. The vacant stage decision circuit 80 is not formed by a multi-input AND gate receiving the outputs of all bits of the dispatch time registers 51, due to problems in view of the operating speed and the number of wires. The NOR gate capable of bit-slice layout is employed with inversion of the inputs, whereby layout regularity is improved with excellent design efficiency, while dense layout is enabled. The vacant stage decision circuit 80 receives a signal EVL for controlling the decision. This signal EVL is supplied to transistors 80b and 80c, and evaluation is made as to whether or not the signal EVL is inputted after shifting by $\phi1$ and $\phi2$ is completed and all outputs to transistors 80d to 80g are at low levels and 80a is at a high level, i.e., as to vacancy, so that the evaluation result is held for a single cycle. In place of the aforementioned NOR gate having a data holding function, the circuit 80 can be formed by combination of an ordinary NOR gate and a D latch holding its output. FIG. 18 is a timing chart showing the output timing of the signal EVL.

The clock control circuit 82 controls supply of the clocks CK1 to CK4, whereby the shift register performs the following operation so that it is possible to reduce power consumption while stopping operations of unnecessary portions.

An operation of the shift register in forward shifting is first noted. Since vacant stages are provided only in a rear part of the shift register, no problem is caused in the operation of the shift register even if all operations of the vacant stages are stopped. When forward shifting is performed in this stage, a stage ahead of a vacant stage is vacated since the same copies the subsequent vacant stage. Therefore, the clocks CK1 and CK2 supplied to $\phi1$ and $\phi2$ may be stopped. In the circuit shown in FIG. 17, gates 82b and 82c of the clock control circuit 82 AND the signal that inverts the output 80a of the vacant stage decision circuit 80 and the clocks CK1 and CK2, thereby supplying new clocks CK1 and CK2 to the register stage.

In backward shifting, on the other hand, data of a precedent stage must be copied in the current stage by backward shifting if the precedent stage is not vacant, and hence it is impossible to stop the shift operation of the current stage. Backward shifting may be stopped if both of the current and subsequent stages are vacant. In the clock control circuit 82, the gate 82a forms NAND of the output 80a of the vacant stage decision circuit 80 of this stage and the output 81a of the precedent stage AND gate. Then, the output of the gate 82a and the clocks CK3 and CK4 are ANDed so that new clocks CK3 and CK4 are supplied to the register stage.

Figure 19:
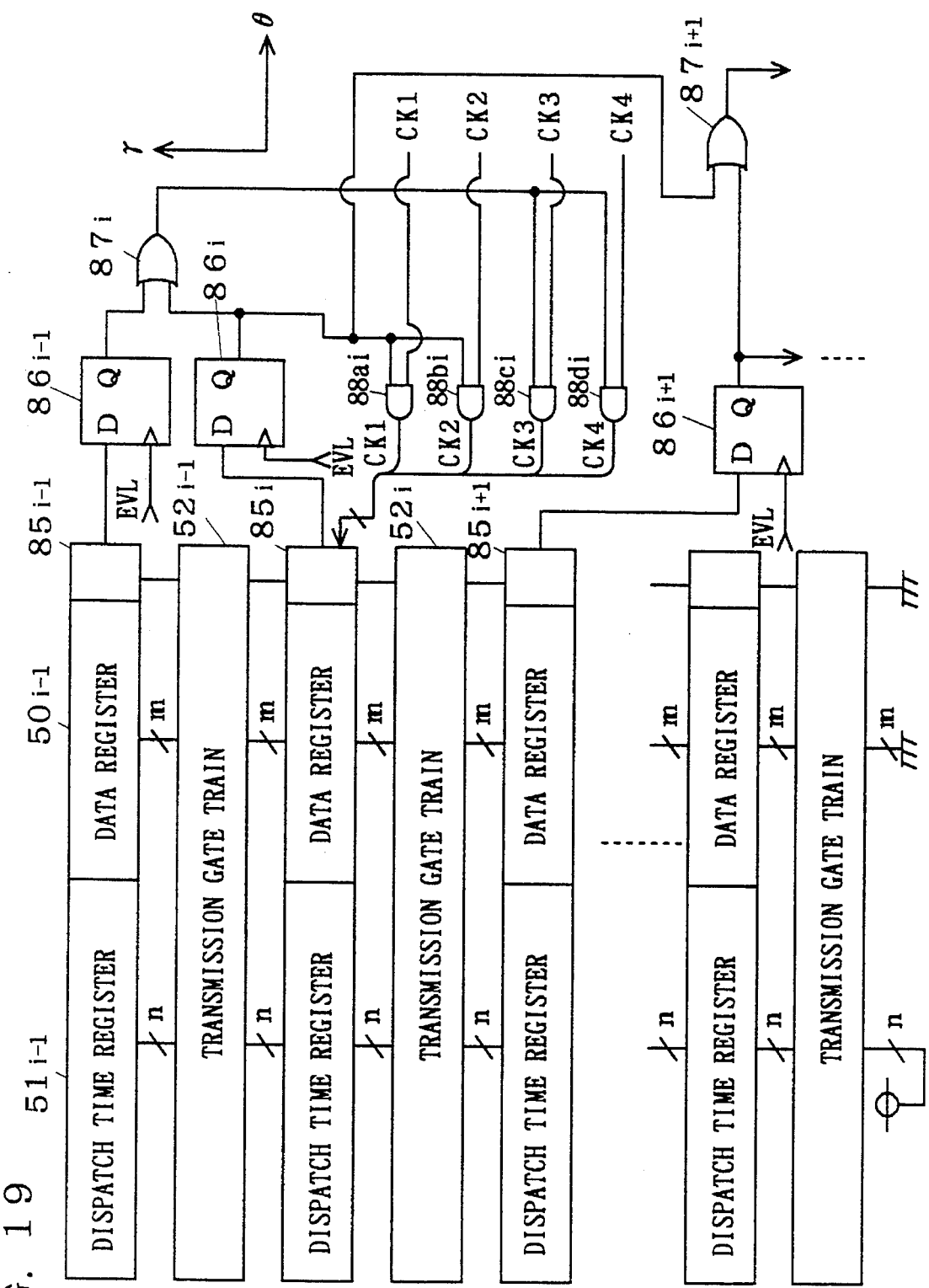
FIG. 19 is a circuit diagram for illustrating the structure of a shift register according to a fourth embodiment of the present invention.

A fourth embodiment of the present invention is now described with reference to FIG. 19. FIG. 19 is a block diagram showing a part of the structure of a shift register according to the fourth embodiment of the present invention. In the third embodiment, the current stage is vacant when all bits of the dispatch time registers 51 indicate "1". According to this structure, 48 (=16×2+16) transistors are required when the dispatch time registers 51 are of 16 bits, for example. When vacancy indicating registers are provided, on the other hand, it is possible to attain the same function by 26 transistors.

Referring to FIG. 19, numeral 85 denotes vacancy indicating registers which are provided in respective register stages for indicating that the register stages are vacant, numerals $86_{i-1}$ and $86_i$ denote D latchs holding outputs of the vacancy indicating registers $85_{i-1}$ and $85_i$ respectively, numeral $87_i$ denotes an AND gate for ANDing outputs of the precedent stage vacancy indicating register $85_{i-1}$ and the current stage vacancy indicating register $85_i$, numerals 88a and 88b denote gates for ANDing the output of the vacancy indicating register $85_i$ and the clocks CK1 and CK2 thereby supplying new clocks CK1 and CK2 to the first register stage, and numerals 88c and 88d denote gates for ANDing the output of the AND gate $87_i$ and the clocks CK3 and CK4 thereby supplying new clocks CK3 and CK4 to the register stage. The aforementioned circuits are provided for all register stages.

Each vacancy indicating register 85 can perform forward shifting and backward shifting by a transmission gate train 52, similarly to a data register 50 and a dispatch time register 51. The vacancy indicating register 85 stores "0" when the stage is vacant. When the rearmost register of the shift register is formed to receive "0" from the transmission gate train 52 as shown in the figure, it is possible to automatically cope with such a case that the rearmost part of the shift register is vacated by forward shifting.

An operation of stopping clocks for unnecessary register stages is similar to that of the shift register according to the third embodiment shown in FIG. 17. While the output 80a of the vacant stage decision circuit 80 shown in FIG. 17 is "1" when the stage is vacant, the vacancy indicating register 85 shown in FIG. 19 outputs "0" when the stage is vacant, and hence the D latch 86 having a structure change therefor holds the output of the vacancy indicating register 85 for one cycle after shifting is completed. If the vacancy indicating register 85 outputs "0", outputs of the AND gates 88a and 88b are brought into low levels by one cycle. Further, the outputs of the AND gates 88c and 88d are brought into low levels only when both of the precedent stage vacancy indicating register $85_{i-1}$ and the current stage vacancy indicating register $85_i$ output "0".

An ordinary forward shift operation is carried out similarly to that of each of the aforementioned embodiments. For example, it is possible to employ the cyclic expression provided with sections for dispatch times with no vacancy indication shown in Table 3. Expression of bringing all bits of the dispatch time registers 51 into "1" is also employed as expression of dispatch times.

Tables 7 and 8 show relations between dispatch times, internal expression and inputs of magnitude comparators in cases of employing 3-bit dispatch time registers as to two ranges having different dispatch times respectively.

TABLE 7

| Dispatch Time | Section | Internal Expression | Maximum Section Signal PM | Input to Magnitude Comparator |
|---|---|---|---|---|
| 10 | 1 | 1-010 | 1 | 1010 |
| 7 | 0 | 0-111 | 1 | 0111 |
| 6 | 0 | 0-110 | 1 | 0110 |
| 5 | 0 | 0-101 | 1 | 0101 |

TABLE 8

| Dispatch Time | Section | Internal Expression | Maximum Section Signal PM | Input to Magnitude Comparator |
|---|---|---|---|---|
| 16 | 0 | 0-000 | 0 | 1000 |
| 13 | 1 | 1-101 | 0 | 0101 |
| 12 | 1 | 1-100 | 0 | 0100 |
| 10 | 1 | 1-010 | 0 | 0010 |

Comparing Tables 4 and 5 with Tables 7 and 8, it is understood that no particular problem is caused also when expression of bringing all bits of the dispatch time registers 51 into "1" is employed as expression of the dispatch times also as to comparison in magnitude comparators.

It is possible to omit the procedure shown in the flow chart of FIG. 11 and obtain dispatch times by binary calculations of concatinating simple section bits since the expression of bringing all bits of the dispatch time registers 51 into "1" is also employed as expression of the dispatch times. As to initialization conditions, data of the vacancy indicating registers 85 are set at "0" indicating vacancy. The structure of a dispatch time analyzing part is simplified due to no requirement for complicated algorithm such as that shown in FIG. 11.

A fifth embodiment of the present invention is now described with reference to FIGS. 20 and 21. Each of the aforementioned embodiments shows a structure for keeping the cell stayable time restriction Td by outputting the data from the ATM switching element successively from that having the smallest dispatch time DPT. However, the network is congested when data beyond processability of the network are received by an error in call-receiving control of the network or the user intentionally transmits data exceeding a self-stated value. Upon occurrence of such a situation, ATM cells which are not transmitted from the ATM switching unit within the cell stayable times Td stay in the buffer of the ATM switching element although the manager makes the best effort in the ATM network.

When the ATM cells incapable of satisfying the stayable times Td belong to a real time channel such as a voice (telephone), the operation is not only in vain but processing of other cells is delayed if the cells stored in proximity to the frontmost stage of the shift register having a priority processing function arrive at the destination in a delay, to hinder solution of the congested network.

It is necessary to also take the quality of communication into consideration in this case, while it may be better to remove ATM cells which are predicted not to satisfy the stayable times Td from the ATM switching element without transmitting the same. For example, data belonging to a real time service, such as data on telephone or image data of video conference, may be partially dropped to slightly deteriorate the quality.

Figure 20:
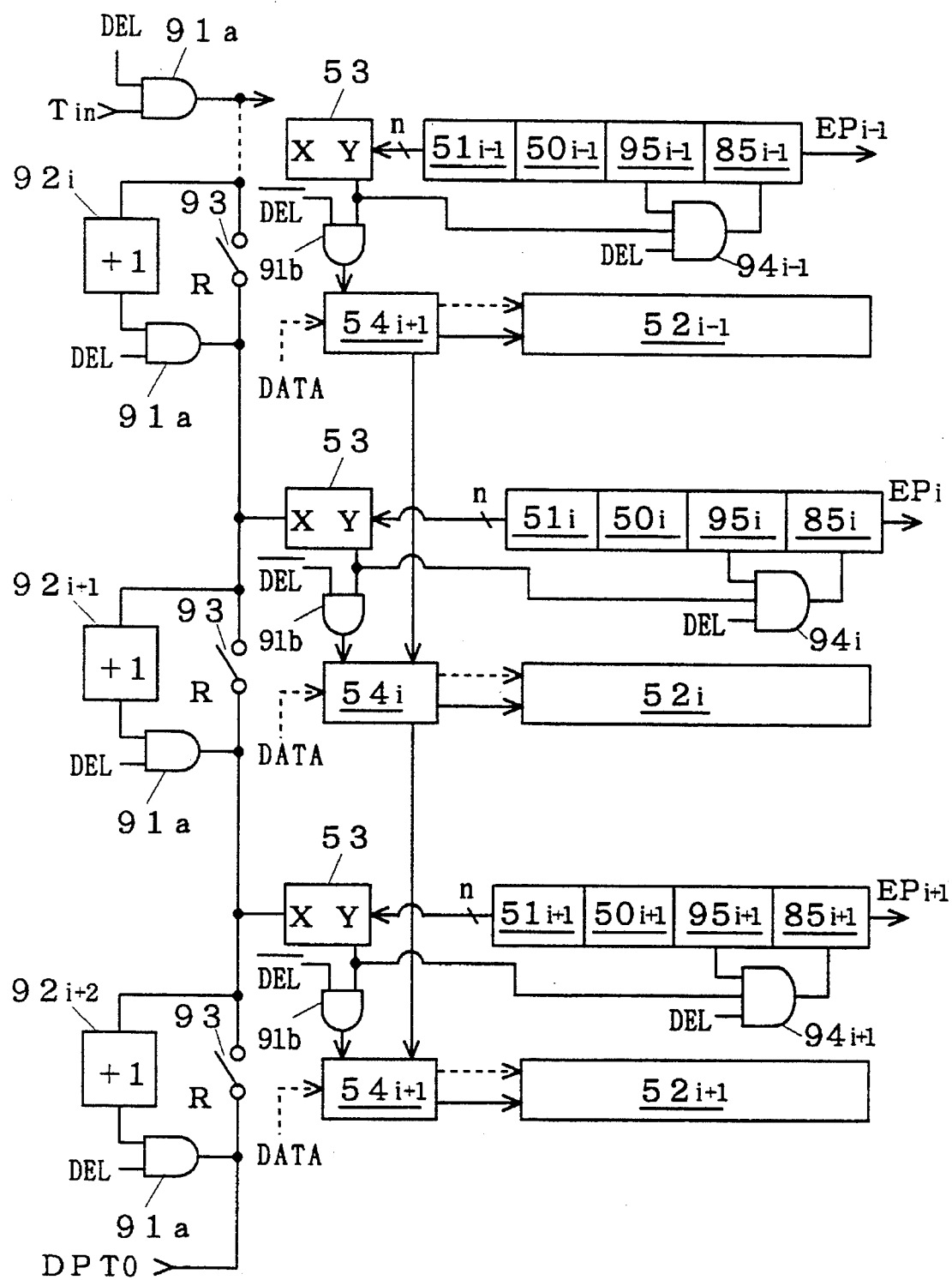
FIG. 20 is a circuit diagram for illustrating the structure of a shift register according to a fifth embodiment of the present invention.
Figure 21:
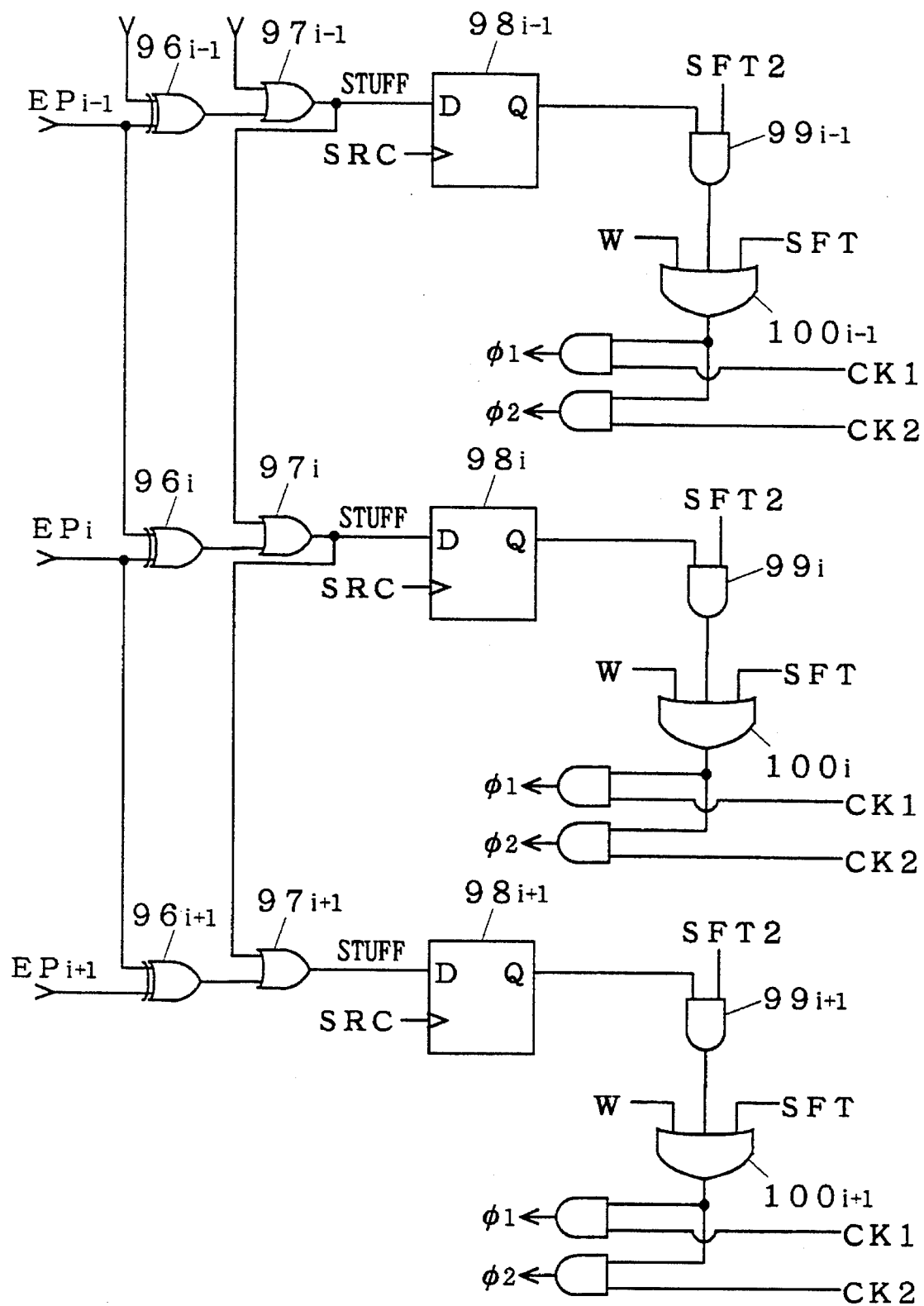
FIG. 21 is a circuit diagram for illustrating the structure of the shift register according to the fifth embodiment of the present invention.

FIGS. 20 and 21 are block diagrams for showing the structure of the shift register according to the fifth embodiment of the present invention. Referring to FIGS. 20 and 21, numeral 91a denotes switches which are controlled by signals DEL to enter conducting states in a mode of discarding ATM cells, numeral 91b denotes switches which are controlled by signals DEL to enter nonconducting states in the mode for discarding the ATM cells, numeral 92 denotes adders for adding "1" to received data and outputting the same, numeral 93 denotes switches whose conducting/nonconducting states are controlled by control signals R, numeral 95 denotes CLP registers which become "1" when the cells can be discarded while storing "0" when the cells must not be discarded, and numeral 94 denotes AND gates having switching functions whose conducting/nonconducting states are controlled by control signals DEL for outputting ANDs of outputs of magnitude comparators 53 and the CLP registers 95 to vacant display registers. Referring to FIG. 21, numeral $96_i$ denotes a two-input exclusive OR gate which is supplied with an output $EP_i$ of a vacancy indicating register $85_i$ of an I-th register stage in its input and with an output $Ep_{i-1}$ of a vacancy indicating register $85_{i-1}$ of a precedent register stage in another input, numeral $97_i$ denotes a two-input OR gate which is supplied with an output of the exclusive OR gate $96_i$ of this stage in one input and with an output of an exclusive OR gate $96_{i-1}$ of the precedent stage in another input, numeral $98_i$ denotes a D latch for holding an output of the OR gate $97_i$ at the timing of a signal SRC, numeral $99_i$ denotes a two-input AND gate for ANDing a signal STF2 for controlling backward shifting and the D latch $98_i$, and numeral $100_i$ denotes a 3-input OR gate for ORing a signal W, the signal SFT and an output of the AND gate $99_i$. Other portions denoted by the same reference numerals as those in FIG. 2 correspond to those appearing in FIG. 2. The three-input OR gate 100, which corresponds to the OR gate 68a shown in FIG. 9, is so structured as to OR the output of the AND gate $99_i$ for newly adding a function, thereby making forward shifting also in the discarding mode.

The operation is now described. In the extra header adding part 56 of the ATM switching element shown in FIG. 1, information CLP (cell-loss priority) for the manager for deciding whether or not prescribed ATM cells can be discarded when the same cannot keep the stayable times Td is supplied to prescribed bits of the extra headers through an OAM network shown in FIG. 25. The information CLP is analyzed by the extra header analyzing part 62a shown in FIG. 1 to be supplied to the shift registers 64a to 64p with cell addresses etc., so that "1" or "0" is stored in the CLP register 95 of each register stage.

The ATM switching unit regularly monitors dispatch times of the ATM cells which are read from the shift registers 64a to 64p shown in FIG. 1. Those which can be simultaneously read from the ATM switching elements are up to a number #p of the outgoing lines. Since the shift registers 64a to 64p are provided in one-to-one correspondence to the respective outgoing lines, only single data are transmitted from the shift registers in one data cycle at the most. Therefore, data provided in an s-th register stage of the shift registers 64a to 64p is read out at a time of Tin+s at the earliest. Namely, the ATM switching unit investigates all cells, and discards those having dispatch times DPT which are smaller than Tin+s with CLP registers 95 storing "1".

When the ATM switching unit carries out monitoring, the switches 91a enter conducting states in the shift register, while the switches 91b and 93 enter nonconducting states. The magnitude comparator 53 of each stage is supplied with a value which is equivalent to its stage number in addition to the time Tin by the adder 92. Table 9 shows decision situations in respective stages as to the current time Tin of 0.

TABLE 9

| Stage Number | DPT | Output F or Magnitude Comparator | CLP | Judgement |
|---|---|---|---|---|
| 1 | 1 | 0 | 1 | o |
| 2 | 3 | 0 | 1 | o |
| 3 | 4 | 0 | 1 | o |
| 4 | 4 | 0 | 1 | o |
| 5 | 5 | 0 | 1 | o |
| 6 | 5 | 1 | 1 | x |
| 7 | 5 | 1 | 1 | x |
| 8 | 6 | 1 | 1 | x |
| 9 | 6 | 1 | 1 | x |
| 10 | 6 | 1 | 1 | x |
| 11 | 7 | 1 | 0 | o |
| 12 | 8 | 1 | 0 | o | x ... To Be Disposed
o ... To Be Stored

The output F of the magnitude comparator 53 becomes "0" through the decision result. Thus, it is possible to clear the vacancy indicating registers 85 to "vacant" states by supplying the outputs of the magnitude comparators 53 to the vacancy indicating registers 85 through the switches 94.

Figure 22:
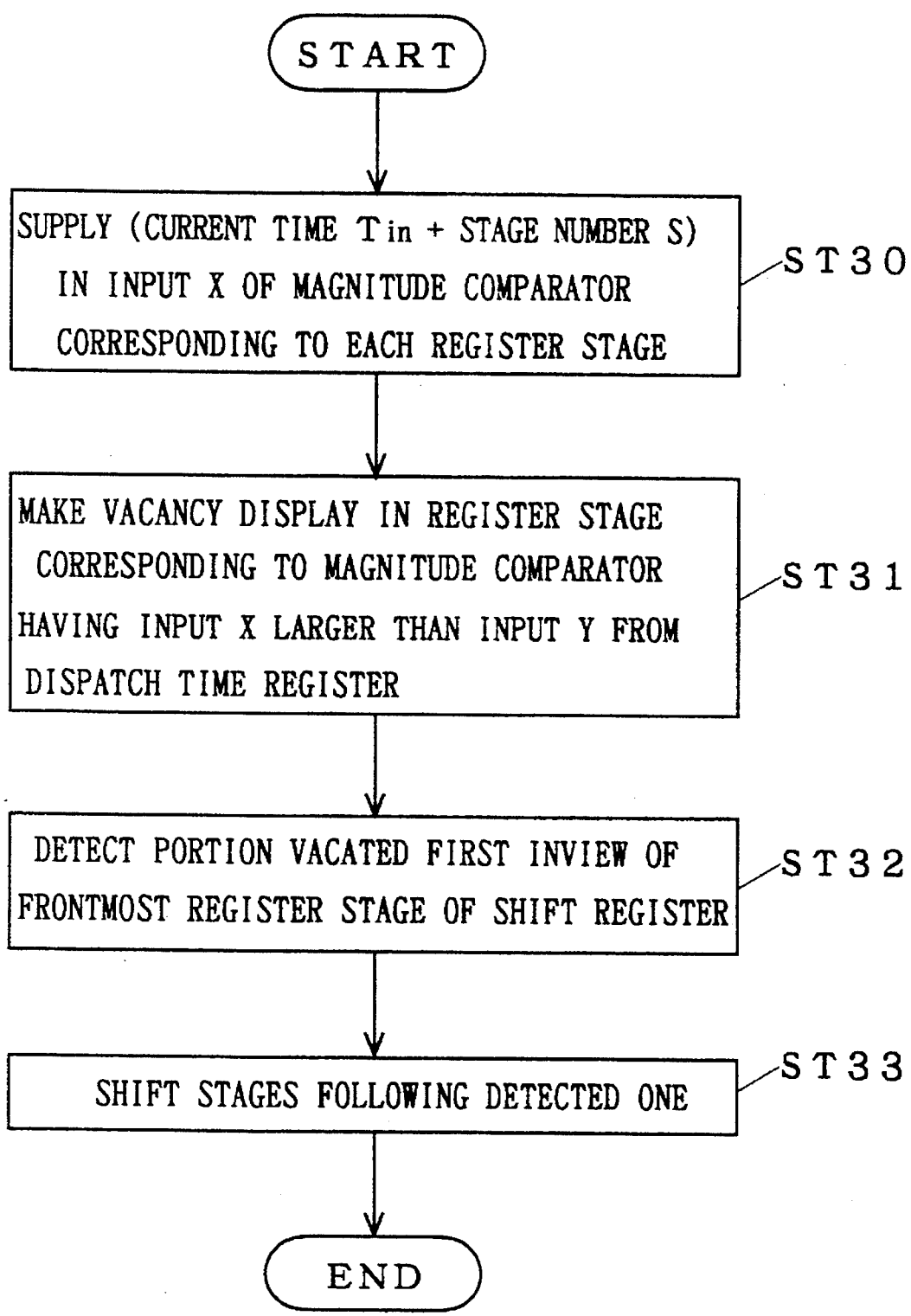
FIG. 22 is a flow chart for illustrating the operation of the shift register according to the fifth embodiment of the present invention.

Description is now made on sequence for eliminating data having no discarding priority specification (CLP) and incapable of reaching deadlines upon output, with reference to a flow chart shown in FIG. 22.

At a step STP30, (current time Tin+stage number S) is supplied to an input X of the magnitude comparator corresponding to each register stage. A register stage corresponding to each magnitude comparator whose input X is greater than the input Y from the dispatch time register is made to indicate vacancy (step ST31).

Then, a portion vacated first in view of the frontmost register stage of the shift register is detected at a step ST32. Stages following the detected one are frontwardly shifted (step ST33).

The above sequence is now described with reference to the circuit shown in FIGS. 20 and 21. A detection circuit for finding the portion vacated first is formed by the exclusive OR gate 96 and the AND gate 97. This detection circuit exclusively ORs outputs of precedent and current stages by the exclusive OR gate 96 (differential processing). Due to this processing, it is possible to find combination of register stages in which storage contents of adjacent registers are "0" and "1" or "1" and "0" in the sequence of the vacancy indicating register 85.

The AND gate 97 ANDs the outputs of the exclusive OR gates 96 corresponding to the combination of the two register stages successively from the frontmost register stage, thereby obtaining such results that all stages become "1" except that which is zeroed first. Table 10 shows this state.

TABLE 10

| Stage Number | Vacant Bit | Output of Exclusive OR Circuit | Output of AND Circuit |
|---|---|---|---|
| 1 | 1 | 0 | 0 |
| 2 | 1 | 0 | 0 |
| 3 | 1 | 0 | 0 |
| 4 | 0 | 1 | 1 |
| 5 | 1 | 1 | 1 |
| 6 | 1 | 0 | 1 |
| 7 | 0 | 1 | 1 |
| 8 | 0 | 0 | 1 |
| 9 | 1 | 1 | 1 |
| . | . | . | . |
| . | . | . | . |
| . | . | . | . |

Figure 23:
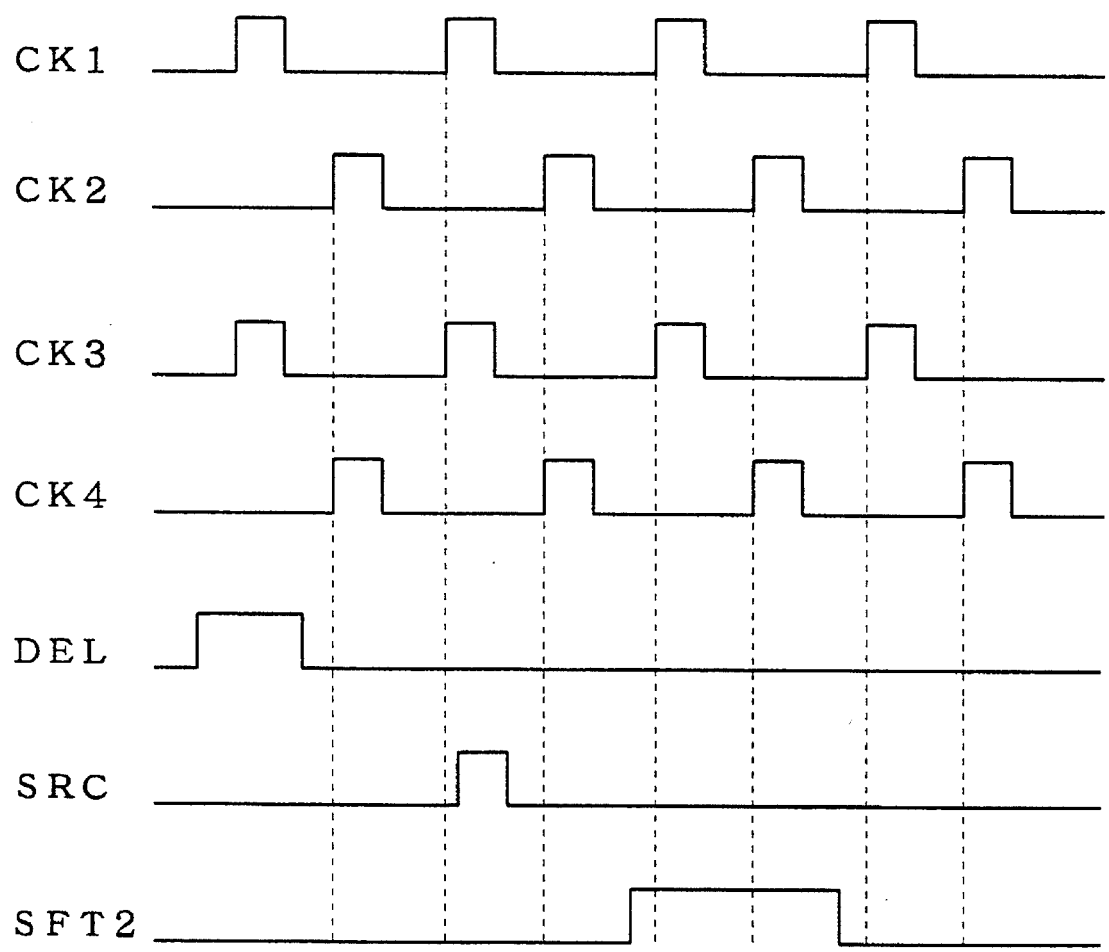
FIG. 23 is a timing chart for illustrating the operation of the shift register according to the fifth embodiment of the present invention.

Then, the clocks $\phi1$ and $\phi2$ are supplied to the register stages in which outputs of the OR gates 97 are "1" to frontwardly shift the same. Then, the register stage which is vacated first in view of the frontmost stage is substituted by data of the subsequent register stage, and data are thereafter successively shifted. Thus, the shift operation in a single discarding mode for substituting the register data whose data is discarded is completed. FIG. 23 shows the control signal DEL currently supplied to the shift register and the like.

After the vacancy indicating registers 85 are cleared by the magnitude comparators 53, a forward shift operation in a discarding decision state is carried out until occupied data is received for filling up forward continuous vacancy with cell data, an operation shiftable in timing may be carried out to attain an effect, if no timing allowance of continuous shifting is provided.

As hereinabove described, it is possible to take flexible countermeasures in response to various situations in the ATM network by discarding data which cannot satisfy the dispatch times. Unnecessary ATM cell data are eliminated from the shift register, to attain such an effect that other ATM cells can satisfy the dispatch times. It is possible to prevent inconvenience of discarding necessary data by providing the CLP register 95.

Considering a case of transmitting ATM cells at 622 Mbps, for example, a cell period of a fixed length of 53 byte is about 700 ns, and a clock number in one cycle is 53 when an operation is made with a clock of 78 MHz. The shift register may carry out data insertion in the shift register and single data reading as to ATM cells newly inputted once in 53 clocks. Thus, it is possible to carry out discard sequence by about 10 times in one cell cycle assuming that three clocks are required for carrying out clearance of the vacancy indicating registers 85 for discarding data incapable of keeping the deadlines, detection of vacancy-displayed data registers and forward shifting in the discarding mode. Thus, data of 10 cells can be discarded in one cell cycle.

Figure 24:
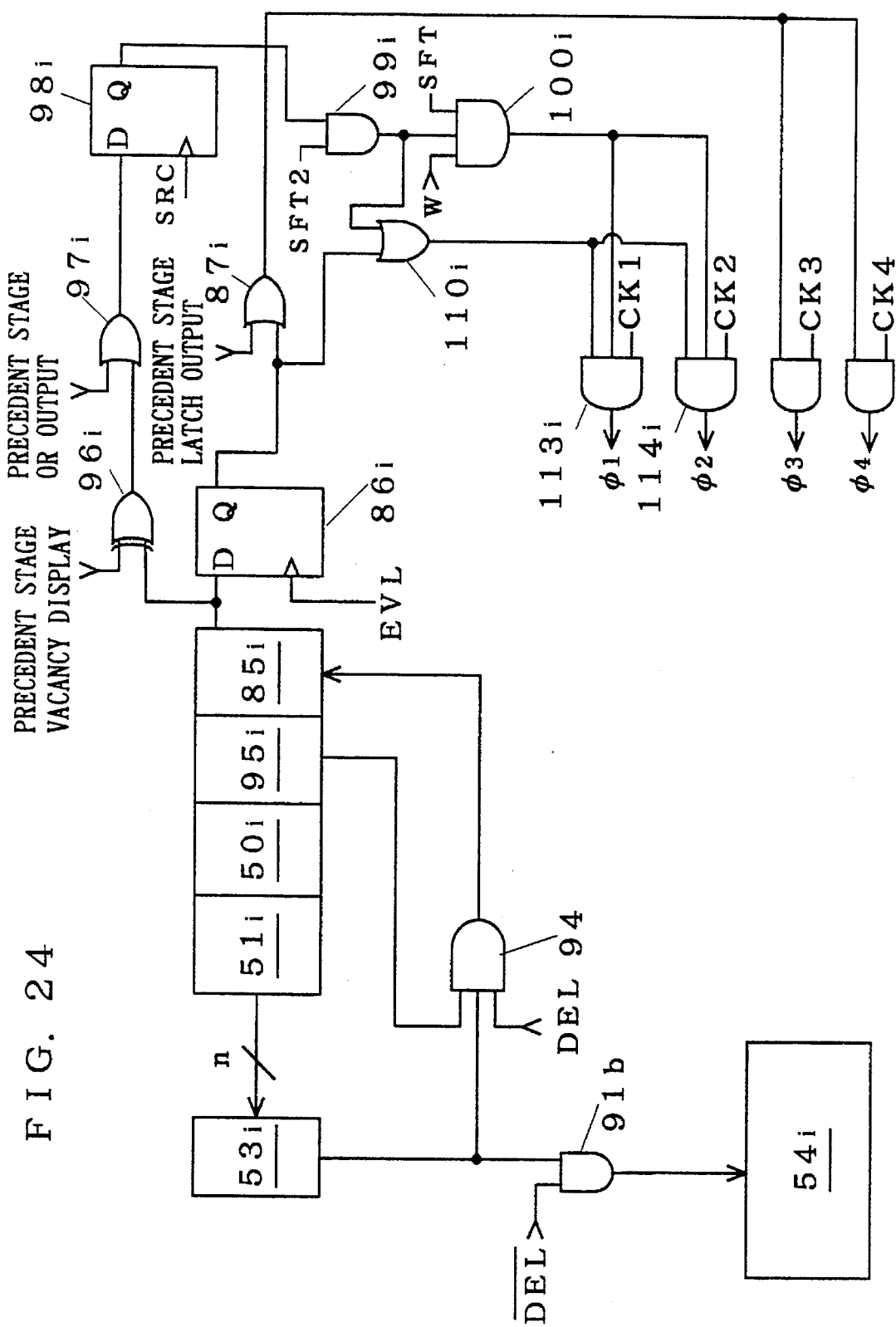
FIG. 24 is a circuit diagram for illustrating the structure of a shift register obtained by combining the fourth and fifth embodiments of the present invention with each other.

FIG. 24 shows a part of a circuit diagram of a shift register obtained by combining the fourth and fifth embodiments. Referring to FIG. 24, numeral 110 denotes an OR gate for controlling a clock control circuit corresponding to an output from a circuit of the fourth or fifth embodiment, numerals 113 and 114 denote AND gates forming the clock control circuit, and other portions denoted by the same reference numerals as those in FIG. 19, 20 or 21 correspond to those in these figures respectively.

While the invention has been shown and described in detail, the foregoing description is in all aspects illustrative and not restrictive. It is therefore understood that numerous modifications and variations can be devised without departing from the scope of the invention.

What is claimed is:

1. A shift register having a priority processing function, comprising:

a plurality of ordered register stages being provided for storing a plurality of data respectively and including regions for storing degrees of precedence of said data to be outputted;

comparison means for comparing said degrees of precedence of said data stored in said register stages with that of newly inputted data; and control means for storing said newly inputted data in one of said register stages in a way that all said data including said newly inputted data are stored in said register stages successively according to said degrees of precedence in correspondence to the order of said register stages on the basis of results of said comparison in said comparison means, said register stages being forwardly shifted for outputting said data being stored therein in said order of said register stages.

2. A shift register having a priority processing function in accordance with claim 1, wherein each of said register stages includes a bidirectional register capable of carrying out a shift operation to either a precedent or a subsequent register stage and for storing said data and said degrees of precedence, the bidirectional registers include first bidirectional registers storing data having degrees of precedence lower than that of said newly inputted data, said control means rearwardly shifting said first bidirectional registers for transferring all data currently stored in said first bidirectional registers from said register stages currently storing the same to subsequent said register stages, for obtaining at least one vacated register stage to write said newly inputted data.

3. A shift register having a priority processing function in accordance with claim 1 or 2, employing deadlines for outputting said data as said degrees of precedence.

4. A shift register having a priority processing function in accordance with claim 1, wherein each register stage further comprises:

indicating means for indicating whether or not said register stage is vacant, and gate means for controlling supply of a clock for making said register stage carry out said frontward shift operation in response to said indication of said indicating means.

5. A shift register having a priority processing function in accordance with claim 2, wherein each register stage further comprises:

indicating means for indicating whether or not said register stage is vacant, and gate means for controlling supply of a clock for making said register stage carry out said rearward shift operation in response to said indication of said indicating means.

6. A shift register having a priority processing function in accordance with claim 1 or 2, wherein said degrees of precedence being stored in all said register stages are set to lowest states at initialization.

7. A shift register having a priority processing function in accordance with claim 1, wherein each register stage includes a region storing information for indicating its vacancy.

8. A shift register having a priority processing function in accordance with claim 7, further comprising clock control means for controlling a clock supplied to each register stage on the basis of said information on its vacancy being indicated.

9. A shift register having a priority processing function in accordance with claim 4 or 5, further comprising:

decision means for deciding whether or not said data being stored in said register stages are to be discarded based on said degrees of precedence being stored therein, and discard means for making said indicating means of those of said register stages holding data decided to be discarded by said decision means indicate vacancy thereof.

10. A shift register having a priority processing function in accordance with claim 9, wherein said data include those being supplied with discard priority specification indicating whether or not the same may be discarded, said decision means regarding said discard priority specification also as reference for deciding whether or not said data are to be discarded, in addition to said degrees of precedence.

11. A shift register having a priority processing function in accordance with claim 9, further comprising substitution means for frontwardly shifting said data of subsequent register stages and substituting the same in those of said register stages being vacated by said discard means.

12. A packet communication switching unit employing the shift register having a priority processing function in accordance with claim 1, wherein said data being stored in said shift register include data being related to inputted packets, said switching unit comprising conversion means, employing remainder theorem, for converting said degrees of precedence to cyclic expressions including section bits and supplying the same to said shift register, said comparison means of said shift register carrying out said comparison through said cyclic expression of said degrees of precedence.

13. A packet communication switching unit in accordance with claim 12, wherein each register stage of said shift register includes a region storing information indicating its vacancy.

14. A packet communication switching unit employing the shift register having a priority processing function in accordance with claim 1, wherein said data being stored in said shift register include data being related to inputted packets, said switching unit comprising precedence supply means having a conversion table for making correspondence between destinations of said packets and said degrees of precedence for supplying said shift register with information of said degrees of precedence in response to said destinations of said packets.

15. A packet communication switching unit in accordance with claim 12, 13 or 14, employing deadlines for outputting said packets as said degrees of precedence.

16. An asynchronus transfer mode network employing the shift register having a priority processing function in accordance with claim 1 or 2, comprising an asynchronus transfer mode switching unit being controlled by operation, administration and maintenance cells and provided with precedence supply means having a conversion table for making correspondence between destinations of inputted asynchronus transfer mode cells and said degrees of precedence for supplying said shift register with information of said degrees of precedence in response to said destinations of said asynchronus transfer mode cells through said conversion table, said data being stored in said shift register include data being related to said asynchronus transfer mode cells being inputted in said asynchronus transfer mode switching unit, said conversion table being changed in response to the contents of said operation, administration and maintenance cells.

17. An asynchronus transfer mode network in accordance with claim 16, employing deadlines for outputting said asynchronus transfer mode cells from said asynchronus transfer mode switching unit as said degrees of precedence.

18. In a packet communication system a packet priority processing method, comprising the steps of:

providing a packet communication switching unit having supply means for supplying deadlines to packets in accordance with a conversion table of said deadlines and destinations, as well as a plurality of register stages including registers for storing both said deadlines of said packets and data related to said packets having said deadlines;

supplying a deadline to a newly inputted packet being newly inputted in said packet communication switching unit through said conversion table and holding said newly inputted packet in said packet communication switching unit;

comparing said deadline of said newly inputted packet with those of said packets being precedently stored in said packet communication switching unit;

storing said deadline and data related to said newly inputted packet in a register stage determined by the comparing step and sequencing data of said plurality of register stages including said data related to said newly inputted packet in order of said deadlines; and transmitting the packet corresponding to data of the register stage storing the smallest deadline from said packet communication switching unit.

19. In an asynchronus transfer mode communication system, an asynchronus transfer mode cell priority processing method comprising the steps of:

providing an asynchronus transfer mode switching unit having supply means for supplying output degrees of precedence to asynchronus transfer mode cells in accordance with a conversion table of said degrees of precedence and destinations, as well as a plurality of register stages including registers for storing both output degrees of precedence of said asynchronus transfer mode cells and data related to said asynchronus transfer mode cells having said output degrees of precedence, and being controlled by operation, administration and maintenance cells;

changing said conversion table of said supply means by said operation, administration and maintenance cells in response to prescribed conditions;

supplying a degree of precedence to a newly inputted asynchronus transfer mode cell being newly inputted in said asynchronus transfer mode switching unit through said conversion table and holding said newly inputted asynchronus transfer mode cell in said asynchronus transfer mode switching unit;

comparing said degree of precedence of said newly inputted asynchronus transfer mode cell with those of asynchronus transfer mode cells being precedently stored in said asynchronus transfer mode switching unit;

storing said degree of precedence and data being related to said newly inputted asynchronus transfer mode cell in a register stage determined by the comparing step and sequencing data of said plurality of register stages including said data related to said newly inputted asynchronus transfer mode cell in order of said degrees of precedence; and transmitting the asynchronus transfer mode cell corresponding to data of the register stage storing the highest degree of precedence from said asynchronus transfer mode switching unit.

20. The method in accordance with claim 19, further employing deadlines for outputting said asynchronus transfer mode cells from said asynchronus transfer mode switching unit as said degrees of precedence.

* * * * *